United States Patent
Avidor et al.

[11] Patent Number: 5,914,946
[45] Date of Patent: Jun. 22, 1999

[54] TDM-BASED FIXED WIRELESS LOOP SYSTEM

[75] Inventors: Dan Avidor, Ocean; Sanjay Kasturia, Middletown; Theodore Sizer, II, Little Silver; Reinaldo A. Valenzuela, Holmdel; Gregory Alan Wright, Colts Neck, all of N.J.

[73] Assignee: Lucent Technologies Inc., Murray Hill, N.J.

[21] Appl. No.: 08/745,392

[22] Filed: Nov. 8, 1996

[51] Int. Cl.⁶ .................................................. H04Q 7/34
[52] U.S. Cl. .......................... 370/336; 455/423; 455/448; 455/67.3; 455/562
[58] Field of Search .................................... 370/336, 339; 455/423, 447, 448, 501, 63, 67.3, 562

[56] References Cited

U.S. PATENT DOCUMENTS 5,313,461  5/1994  Ahl et al. .
5,448,753  9/1995  Ahl et al. .
5,515,378  5/1996  Roy, III et al. ........................ 370/95.1
5,742,252  4/1998  Nguyen et al. ......................... 342/156

OTHER PUBLICATIONS

Zander et al., "Capacity of Time–Space Switched Cellular Radio Link Systems For Metropolitan Area Networks," IEE Proc., vol. 139, No. 5, Oct. 1992, pp. 533–538.

*Primary Examiner*—Melvin Marcelo

[57] ABSTRACT

A time-division-multiplexed fixed wireless loop system and methods therefor are disclosed. The system comprises a plurality of cells each having a base station and a plurality of terminals. The base station includes a steerable and adjustable multibeam antenna for communicating with each of the terminals, which have fixed antennas. A cell controller associated with each base station allocates communication time slots so as to minimize mutual interference between base station/terminal links sharing the same time slot. Slot assignment is based on regional, periodically updated interference measurements that are stored in data bases.

10 Claims, 17 Drawing Sheets

TDM-BASED FIXED WIRELESS LOOP SYSTEM

STATEMENT OF RELATED CASES

The present case is related to co-pending U.S. patent application Ser. Nos. 08/745,380 and 08/745,382.

FIELD OF THE INVENTION

The present invention relates to wireless loop systems, and more particularly to fixed wireless loop systems based on time division multiplexing schemes.

BACKGROUND OF THE INVENTION

Fixed wireless loop (FWL) communications systems support distribution of data and voice transmission. Such systems are usually segmented into "cells." A base-station antenna located within each cell transmits signals to, and receives signals from, a plurality of terminals or peripheral stations also located within the cell. The cell need not be contiguous; the base station of one cell may service a select region or regions within the nominal boundaries of a nearby cell as geography or other factors dictate. The large number of transmitting sources present in FWL systems create a potential for a significant amount of interference with the communication between any particular base station antenna and terminal. Such interference can be caused by other transmitters within the cell, or in other cells.

FWL systems typically utilize methods of frequency division multiplexing (FDM), time division multiplexing (TDM) or code division multiplexing access (CDMA)) to maximize system capacity and mitigate interference. Presently, it is widely believed that CDMA-based FWL systems are superior to TDM and FDM systems in terms of achieveable capacity. The main reason for this belief is that TDM and FDM are limited to high frequency reuse factors, typically about seven, while the frequency reuse factor for CDMA can be set to one. Sectorized antennas further increase the perceived advantage of CDMA, because it is typically considered impractical to lower the reuse factor of TDM-based systems even when sectorized base station antennas are available.

CDMA-based systems possess a limitation, however, that is not shared by TDM-based systems. In particular, in CDMA-based systems, the base station antenna continuously illuminates all the terminals within a cell or sector. In TDM-based systems, the base station antenna for a particular cell illuminates only those terminals that are active during a particular time slot. The potential therefore exists for TDM-based systems to collect less interference from other emitters and to generate less interference to other receivers.

SUMMARY OF THE INVENTION

A system and method for a TDM-based fixed wireless loop system are disclosed. The present system consists of a plurality of cells, each containing a base station and a plurality of terminals. Each base station generates several antenna beams for receiving transmissions from terminals within the same cell ("in-cell terminals") and other beams for transmitting to the in-cell terminals. Each receive beam and each transmit beam communicates with one terminal for an allocated period of time known as a time slot.

Associated with each base station is a cell controller that regulates access to the air, and beam and time slot allocation. In one of many novel aspects of the present system, time slots are allocated based on the prevailing system interference. In particular, for approval of receive or "uplink" slots, i.e., slots used for terminal transmissions to the base station, the interference level at the base station receiver due to other in-cell and out-of-cell transmitting terminals must be low enough to allow satisfactory reception. In addition, transmission on the selected slot must not render other links unusable. As to transmit slots, i.e., slots used for base station transmissions to a terminal, the interference level at the terminal receiver due to other in-cell transmit beams and out-of-cell transmit beams on the same slot must be low enough to allow satisfactory reception. Furthermore, the transmit beam on that slot must not render other links unusable.

To allocate time slots based on out-of-cell interferers requires communication between the cell controllers of neighboring cells. In another novel aspect of the present invention, each cell controller shares information concerning the activation and deactivation of base station—terminal links within its cell with other cell controllers in the system. To estimate the affect of such out-of-cell changes, each cell controller accesses a novel data base containing information about the mutual interference levels between every potential link in the cell controller's cell and every potential link in neighboring cells. In preferred embodiments, each cell controller has its own data base. The data base is periodically updated to reflect changing system conditions.

A terminal's request for access to the air is denied unless a suitable transmit and a suitable receive slot are found. As such, the present invention protects active links from interruptions and call drops by blocking service requests if necessary. Such protection is in contrast to CDMA-based methods in which blocking may take the from of incremental degradation in the quality of ongoing calls, sometimes leading to call drops.

If a terminal's service request is accepted, the cell controller directs its beam formers to synthesize an antenna pattern that results in an optimized signal to interference ratio at the antenna output.

BRIEF DESCRIPTION OF THE DRAWINGS

Further features of the invention will become more apparent from the following detailed description of specific embodiments thereof when read in conjunction with the accompanying drawings, in which.

DETAILED DESCRIPTION OF THE INVENTION

For clarity of explanation, the illustrative embodiments of the present invention are presented as comprising individual functional blocks. The functions these blocks represent may be provided through the use of either shared or dedicated hardware, including, but not limited to, hardware capable of executing software.

Figure 1:
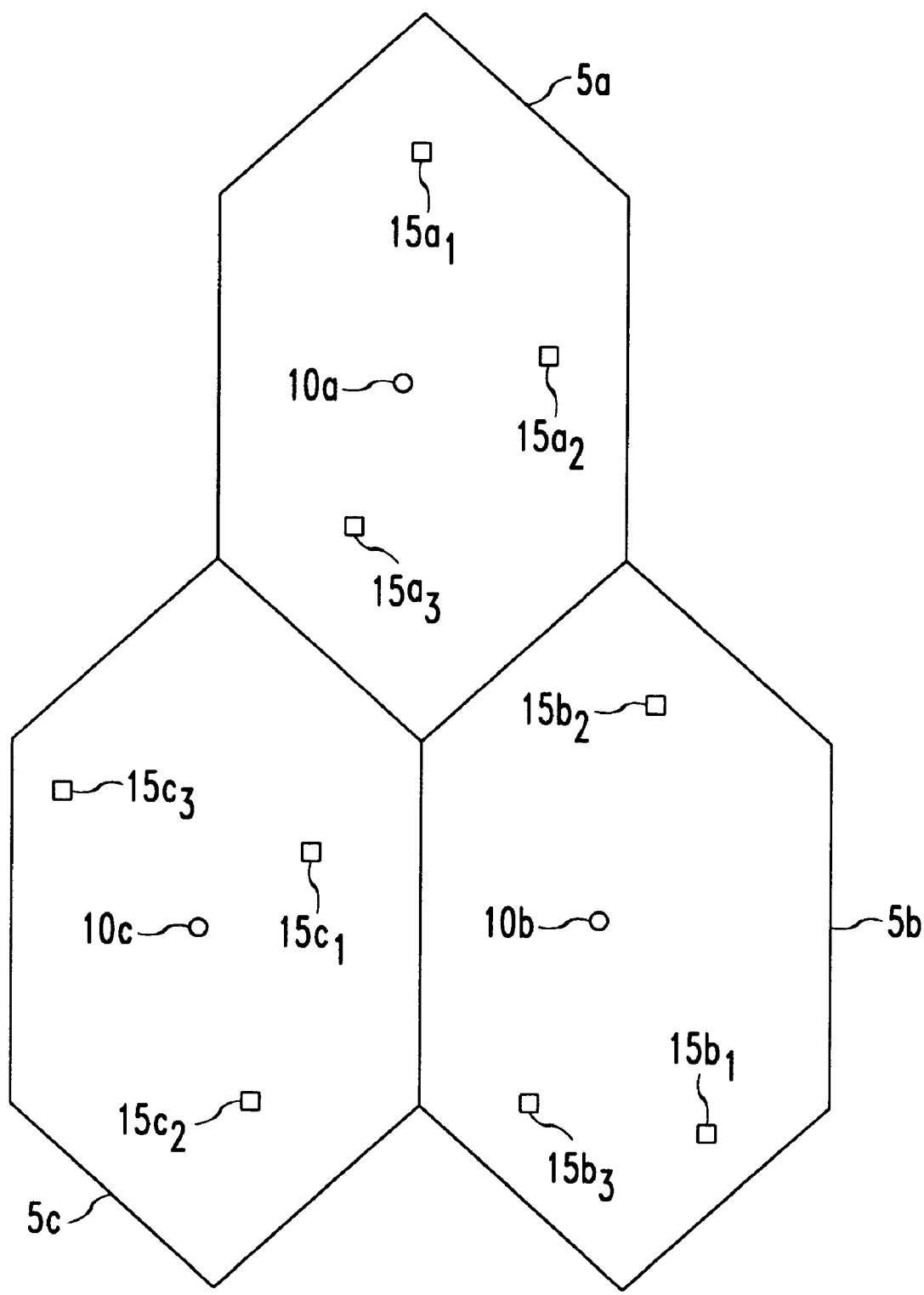
FIG. 1 is a simplified representation of a cellular FWL system according to the present invention.

A time-division-multiplexed (TDM)-based fixed wireless loop (FWL) system according to the present invention is capable of supporting conventional telephony, data, internet access, multimedia services and the like. The system can be conceptualized as including a plurality of hexagonal cells 5, three of which cells are shown in FIG. 1 and identified as 5$a$, 5$b$ and 5$c$. For clarity, the reference identifier for each feature within a particular cell will have an alphabetic character appended thereto to identify the feature as belonging to the particular cell, e.g., "a," "b," or "c." The alphabetic character will be dropped for generic reference to cells or features.

The aforementioned hexagonal cell shape is the classical shape for design and analysis of wireless loop systems. It should be understood, however, that the cells 5 are not limited to having the idealized hexagonal shape. A variety of factors, not the least of which is geography, will influence the desired shape of such cells for any particular implementation.

Within each cell 5 is a centrally-located base station 10 and a plurality of terminals or peripheral stations $15_{1-n}$. The base station 10 and each terminal $15_i$ includes an antenna and associated receiving and transmitting electronics. While in FIG. 1, only three terminals $15a_{1-3}$, $15b_{1-3}$ and $15c_{1-3}$ are shown within each of the respective cells 5$a$, 5$b$ and 5$c$, it should be understood that many more of such terminals are typically present in any given cell 5. The identifier $15_i$ will be used for generic reference to a single terminal.

As those skilled in the art will recognized, the afore-described configuration of the present FWL system is very similar to mobile cellular systems. Instead of mobile units, the present FWL system has a plurality of fixed terminals $15_{1-n}$. Such fixed terminals have antennas typically installed on roof-tops and the like.

In preferred embodiments, each terminal antenna is directional. It will be appreciated, however, that due to severe size and cost constraints, such antennas may be only moderately directional. Each terminal antenna is directed to face the antenna of its respective base station 10. Additional description of a preferred embodiment of a terminal antenna is provided later in this specification.

Figure 2:
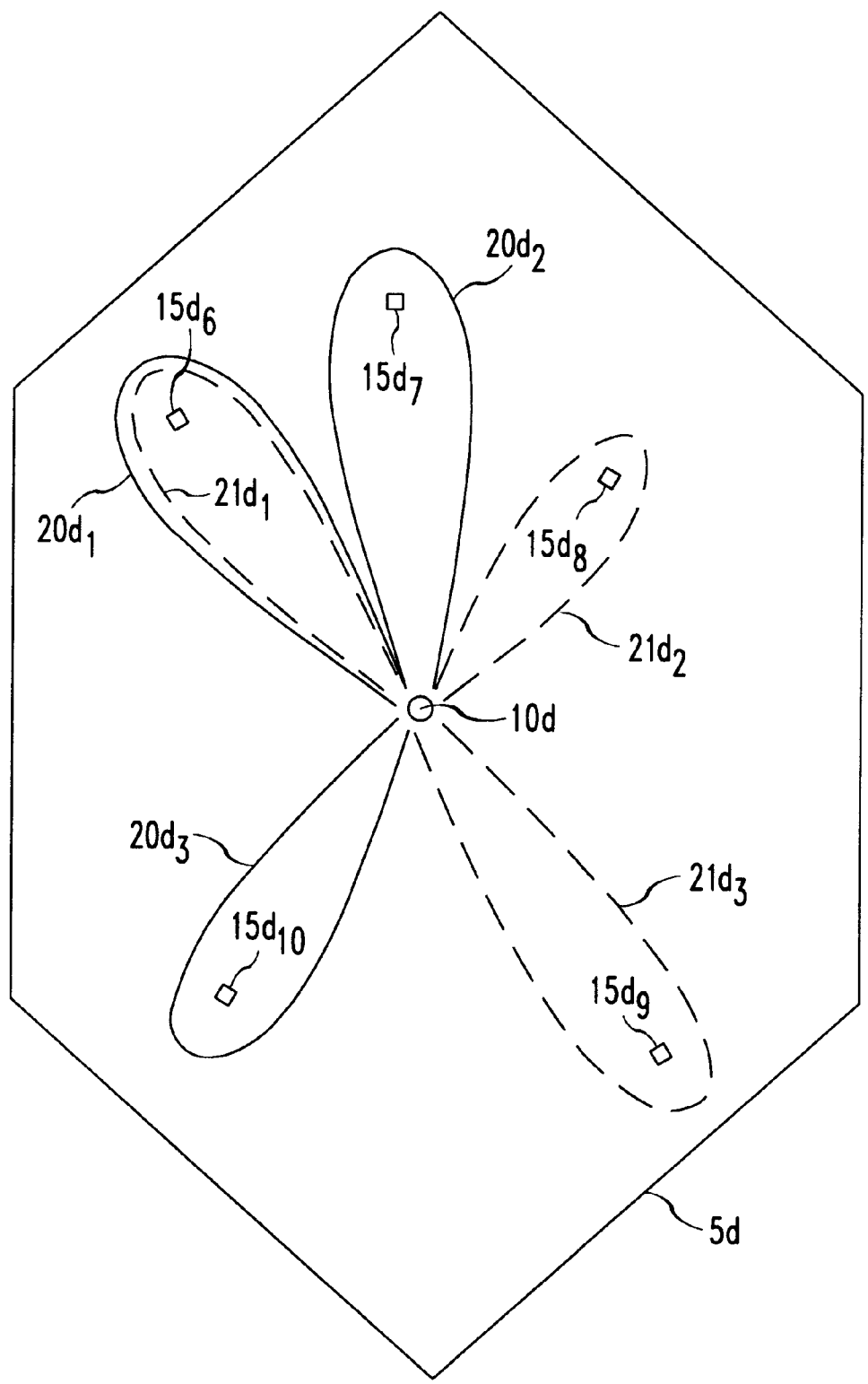
FIG. 2 shows beams generated by the base station antenna of one of the cells of the system of FIG. 1.

In conjunction with suitable electronics and methods described in more detail later in this specification, the antenna of each base station 10 generates several beams that "hop" or move throughout the cell 5, receiving and sending transmissions. As shown in FIG. 2 for an exemplary cell 5$d$, the generated beams include "receive" or "uplink" beams 20$d$ that receive transmission on a first frequency, $f_1$, from the terminals $15d_{1-n}$. The generated beams further include an equal number of "transmit" or "downlink" beams 21$d$ for transmitting information, on a second frequency, $f_2$, to the terminals $15_{1-n}$. While such duplex operation is preferably implemented using FDM, e.g., two different frequencies, $f_1$ and $f_2$ as described above, other methods for implementing duplex operation, among them time division duplexing (TDD), can be used. The term "link" will be used herein to refer, generally, to both the uplink and downlink communications between a base station 10 and terminal $15_i$.

In the exemplary illustration of FIG. 2, three uplink beams $20d_{1-3}$ and three downlink beams $21_{1-3}$ communicating with five terminals $15d_{6-10}$ are shown. In other embodiments, more or less simultaneously generated beams can be implemented. It will be appreciated that increasing the number of simultaneously generated beams potentially increases system capacity. Such an increase in beams, however, also increases interference levels. Thus, the number of beams per cell is limited by interference levels, and will vary due to factors, such as, for example, geography, concentration of terminals, building height and the like. It is expected that the number of simultaneously generated beams per cell will typically be in the range of about 2 to about 7.

Figure 3:
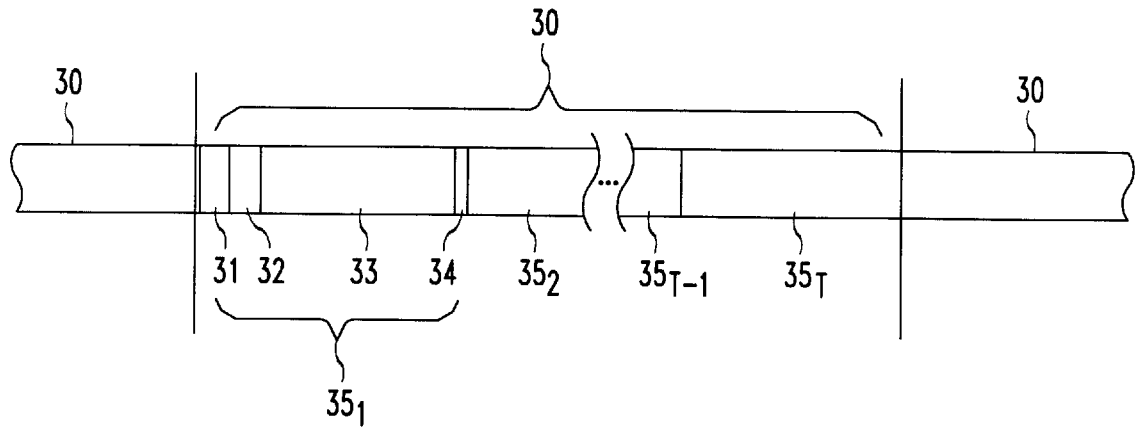
FIG. 3 shows an exemplary frame structure.

As previously noted, the present invention utilizes TDM. Thus, FIG. 2 shows the operation of the present TDM-based FWL system at one point in time. As illustrated in FIG. 3, the time axis is divided into periodic frames 30, each having a plurality of time slots $35_{1-T}$. The time available in each time slot $35_i$ is typically unequally apportioned to deliver a preamble 31, to provide user identification and syncronization information 32, to provide the "payload" 33, and to provide guard time 34. The frames 30 have a typical duration on the order of milliseconds, while each time slot is significantly shorter. It will be appreciated that the time allotted per frame 30 and per time slot $35_i$ can vary depending on the communication requirements of a particular application and implementation preferences.

An uplink beam 20 receives information from a single terminal $15_i$, and a downlink beam 21 transmits information to a single terminal $15_i$ for the duration of a time slot $35_i$. The downlink to and uplink from a particular terminal, need not, however, be contemporaneous. For example, FIG. 2 shows downlink beam $21d_1$ and uplink beam $20d_1$ communicating with terminal $15d_6$ during the same time slot. On the other hand, the downlink and uplink between the base station 10$d$ and each of the terminals $15d_7$, $15d_8$, $15d_9$ and $15d_{10}$ are not contemporaneous.

Typically, a terminal 15 is assigned one slot $35_i$ per time frame 30 for receiving/transmitting. More than one slot per frame, however, either on the same beam or other beams, can be assigned to a single terminal $15_i$ depending upon communication requirements. For example, if there is a large amount of data transmission to or from a particular terminal $15_i$, that terminal can be assigned several time slots per frame.

The total number of "active" terminals that can be supported per cell is upper bounded by b×T, where b is the number of beams per cell and T is the number of time slots per frame. The actual number of active terminals 15 is usually less than b×T, even when demand exists, due to interference considerations. In particular, some time slots, depending on the location of the terminals 15 requesting service at that time, might be unusable due to severe interference. Moreover, such slots might need to remain unused in order to avoid interfering with certain active terminals.

In preferred embodiments, the frame and time slot boundaries in all the beams 20 and 21 and all the cells 5 are synchronized, or nearly synchronized. Synchronization simplifies the control of mutual interference. Such synchronization presents a problem, however, since propagation time across the radius of a cell 5 can be larger than the guard time 34 between successive slots. In order to maintain the guard time, the "start of transmit" time of each terminal $15_{1-n}$ must be shifted forward by an amount proportional to the range between the terminal 15 and the base station 10. In this way, transmissions from terminals 15 belonging to the same cell and time slot can interfere with each other only during that particular time slot.

This is not the case with out-of-cell interferers. Significant interference from other cells 5 can arrive during the full duration of the next time slot and will typically affect both the current and the succeeding time slot. One method for addressing out-of-cell interference is simply to assume that the interference is present on both time slots. Such an approach results in conservative estimates of interference levels.

The present "interference limited" FWL system preferably includes power control for reducing the spread in received signal power between short links and long links. A terminal having a high path loss to its base station should transmit more power than a terminal having a low path loss. Similarly, a base station transmitter transmitting toward high path loss terminals may transmit higher power than it transmits toward lower path loss terminals. It will be appreciated that when signal strengths measurements are obtained for data base construction and updating, the correct transmit power level should be used.

In further embodiments, transmitted power can be controlled dynamically, wherein the system compensates for the interference power existing at the time. In such a method, the transmitting power of all transmitters in the system is not fixed. In one embodiment of dynamic power control, the transmit power is determined once before the link goes on the air, and is fixed thereafter. In other embodiments, the transmit power can be changed at any time based on the prevailing quality of the link.

It should be understood that embodiments wherein transmit power is determined once before air time and then fixed require significantly less coordination, calculations and information flow between the cell controllers than is required for the embodiments in which transmit power remains variable. In the exemplary embodiments of the present invention described herein, transmit power is fixed. Power control can be implemented in a variety of ways by those skilled in the art.

The interference level will typically change significantly from link to link depending on the location of other links active at the time. Moreover, it is expected that on the average the downlinks will experience lower interference than the uplinks. The reason for this is that the intra-cell subset of downlink interferers, i.e., the interference caused by other beams emanating from the same base station 10, are likely to fade in correlation with the desired signal itself, since they are all traveling on the same path or set of paths.

As such, in some preferred embodiments, an adaptive coding and/or modulation method is implemented to salvage time slots that are otherwise unusable. For example, two time slots with low rate coding can be assigned if a single time slot cannot provide the required performance.

Alternatively or in conjunction with adaptive coding and modulation, a form of time diversity can be implemented by assigning multiple time slots to one terminal $15_i$, exploiting the fact that interference on different time slots is generated by different transmitters that fade independently. Such a method is particularly advantageous when the interference in each time slot is dominated by a single emitter, which reaches the receiver through a Rayleigh fading channel. In other embodiments, angle diversity can be used. In such a case, two beams could be used on the same time slot to utilize two replicas of the signal, arriving from different directions.

As is customary in telephony, the number of installed terminals 15 significantly exceeds the capacity of the system, which means that a terminal $15_i$ may be rejected when applying for service. Given a set amount of installed terminals and the typical limitations of a FWL system, a TDM-based FWL system according to the present invention lowers the probability of such a rejection, compared to conventional systems.

The set of active terminals 15 is therefore a subset of the total population of terminals in a cell 5. This subset changes with time as dormant terminals apply for, and are granted service, and active terminals conclude their session and "hang up". According to the present invention, the task of controlling access to the air and allocating beams 20 and 21 and times slots $35_{1-T}$ is performed by a cell controller 25, shown in FIG. 16.

The cell controller 25 is preferably implemented as a suitably-programmed microprocessor that is located at the base station 10 of each cell 5. Among other functions, the cell controller 25 receives and processes applications for service by previously dormant terminals 15. The request can be carried over a control channel 27, which can be implemented in a variety of ways known to those skilled in the art with small effect on system capacity. For example, the control channel 27 can be established on a frequency other than the frequencies $f_1$ and $f_2$ utilized for uplink and downlink.

Figure 4:
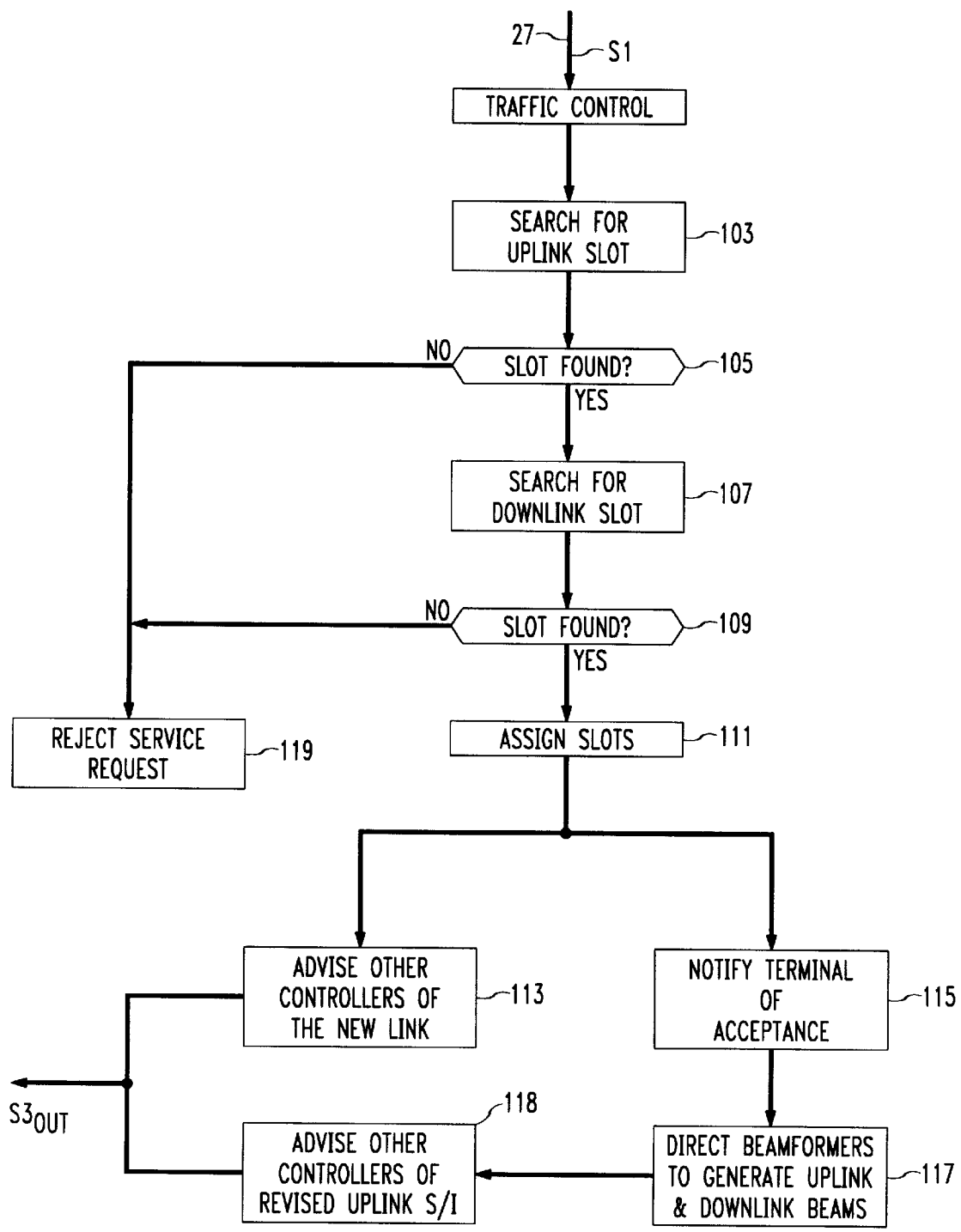
FIG. 4 is a flow diagram illustrating several cell controller activities.

An exemplary method according to the present invention by which the cell controller processes a service request by a terminal $15_i$ is illustrated in FIG. 4. As shown in operation block 101 of FIG. 4, the cell controller 25 receives a service request S1 over the control channel 27. The cell controller 25 searches for a suitable uplink time slot for the terminal, as indicated by operation block 103.

In the present context, a suitable uplink slot preferably satisfies two conditions. First, the interference level at the base station's receiver should be low enough to allow acceptable reception. Second, the requesting terminal's transmission on that slot should not affect other base stations that are already on the air on that slot to such an extent that its link's performance becomes unacceptable.

If a suitable uplink slot is found, the cell controller 25 then searches for a suitable downlink time slot for the terminal, as noted in operation block 107. A suitable downlink slot similarly satisfies two conditions. First, the interference level at the terminal's receiver should be low enough to allow satisfactory reception. Second, the base station's transmission on the slot should not degrade the performance of other on-air terminals to the point of unacceptability. It should be understood that there is presently no preference for which slot is searched first.

It should be understood that the above-referenced "interference levels" and "unacceptable performance" are system design parameters that are dependent upon a variety of considerations, including, without limitation, modulation scheme, fading environment and the like. It is within the capabilities of those skilled in the art to define such terms for a particular implementation of a FWL system. A more detailed description of an exemplary method for selecting the uplink and downlink slots are provided later in this specification in conjunction with the discussion of FIG. 9.

If the cell controller 25 does not find a suitable downlink slot and a suitable uplink slot, the application for service is rejected, as indicated in operation block 119. Thus, a TDM-based FWL system according to the present invention protects current users from interruptions and call-drops by blocking new users, if appropriate. This is in contrast to CDMA-based systems, in which "blocking" takes the form of incremental degradation of ongoing calls, leading, in some cases, to call drops.

If an uplink and downlink slot are found, they are assigned to the terminal as shown by operation block 111. The requesting terminal is notified of such assignment per operation block 115. The cell controllers of other neighboring cells are apprised of the new link by the cell controller 25. Communication and coordination between neighboring cell controllers, which is a important feature of preferred embodiments of the present invention, is described in more detail later in this specification.

After the cell controller 25 allocates the downlink and uplink slots to the requesting terminal $15_i$, it directs beam formers 40 to calculate the downlink beam and uplink beam for use during the appropriate time slots. The beam formers 40, which can be implemented as suitably programmed, dedicated microprocessors, "shape" each downlink beam 21 and each uplink beam 20 to maximize the signal-to-total-interference ratio ("S/TI"). The resulting uplink beam 20 radiation pattern exhibits "notches" at angular offsets from the main lobe positioned to attenuate the signals received from sources of significant interference ("strong interferers"). The resulting downlink beam 21 radiation pattern exhibits notches at angular offsets from the main lobe that are positioned to attenuate the signal received by terminals 15 that would experience significant interference from the transmission in the absence of such notches. Typically, a relatively "deeper" notch will be generated to attenuate a relatively strong interferer, while a relatively "shallower" notch is generated to attenuate a relatively weaker interferer.

Figure 5:
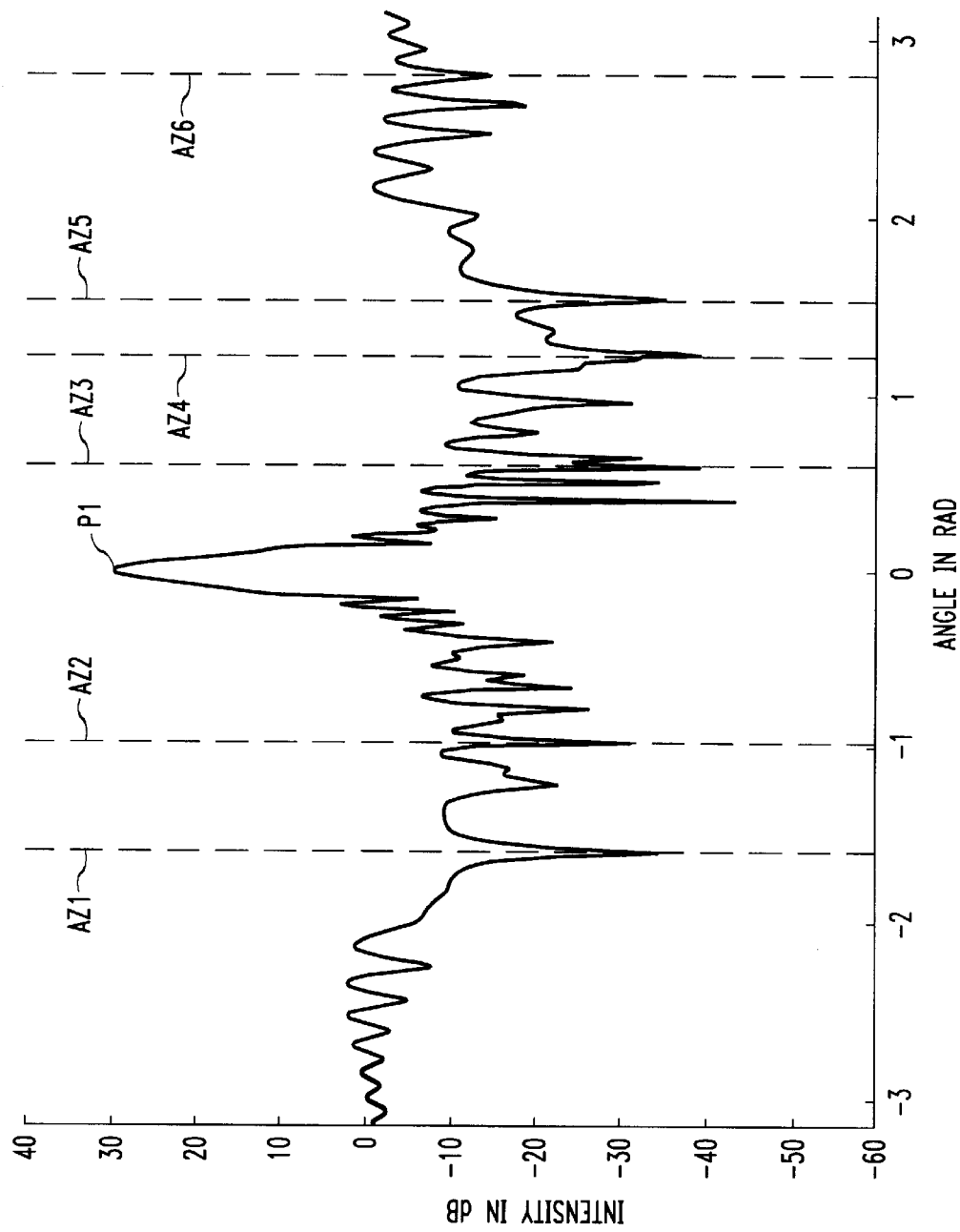
FIG. 5 shows an exemplary radiation pattern of a beam.

FIG. 5 shows an exemplary radiation pattern for a beam. The beam was calculated to attenuate six strong interferers located at six angular offsets from the center of the main lobe, P1, as indicated by the reference identifiers AZ1–AZ6. The plot in FIG. 5 shows that due to the radiation pattern of the base station's uplink beam 20, only a very low interfering-power signal is received from the six potential interferers at the angular offsets AZ1–AZ6.

Further description of the beam formers 40, and exemplary methods by which they determine the optimal uplink and downlink beams are provided later in this specification in conjunction with the discussion of FIGS. 11–14 and 16–18.

It was noted above that, among other activities, the cell controller determines whether the requesting terminal's transmission on the uplink slot affects other base stations already on the air. Such a determination requires that the cell controller 25 of a given cell 5 has access to information concerning interference levels in links located in other cells. Such "inter-cell" coordination or communication, wherein beam shaping and slot assignment for a given cell are based not only on conditions within the given cell but also on conditions in neighboring cells allows for optimum functioning of the system. Preferred embodiments of the present invention utilize inter-cell coordination.

If such inter-cell coordination is used, each cell controller 25 collects real-time information from "neighboring" cell controllers about activities in their cells and shares with them information regarding the activity in its own cell. Further description of the collected information is described later in this specification. Communication between neighboring cell controllers 25 can be accomplished using conventional wired digital communications technology.

Neighboring cells 5 and neighboring cell controllers 25 are defined herein as those that belong to the "cluster" of a particular cell. A neighboring cell, such as the cell $5a$, is considered to belong to the cluster of a particular cell, such as the cell $5c$, if transmissions originating from cell $5a$ can cause "significant" interference with reception in cell $5c$, or if transmissions originating from cell $5c$ can cause "significant" interference with reception in cell $5a$. In other words, a cell never significantly affects and is never significantly affected by radio activities in cells that do not belong to its cluster, typically because a sufficiently large distance separates them.

In the implementation of the present system by one skilled in the art, the term "significant" will require quantitative definition, such as, for example, a particular value of an interference power. The numerical value ultimately chosen to define "significant" interference results from compromises based on the design priorities for a particular application, e.g., capacity, signal to noise ratio, available computing power and the like. It is within the capabilities of those skilled in the art to quantitatively define the term "significant" in the context of a specific system design.

In other less preferred embodiments, the present invention can be implemented using only "intra-cell" coordination. For embodiments utilizing intra-cell coordination alone, beam shaping and time-slot assignments for a given cell are based on minimizing mutual interference within the cell without regard to conditions in neighboring cells. For the remainder of this specification, the embodiments described will utilize inter-cell coordination. It should be understood, however, the various embodiments of the present invention may be implemented utilizing intra-cell, rather than inter-cell, coordination.

Figure 16:
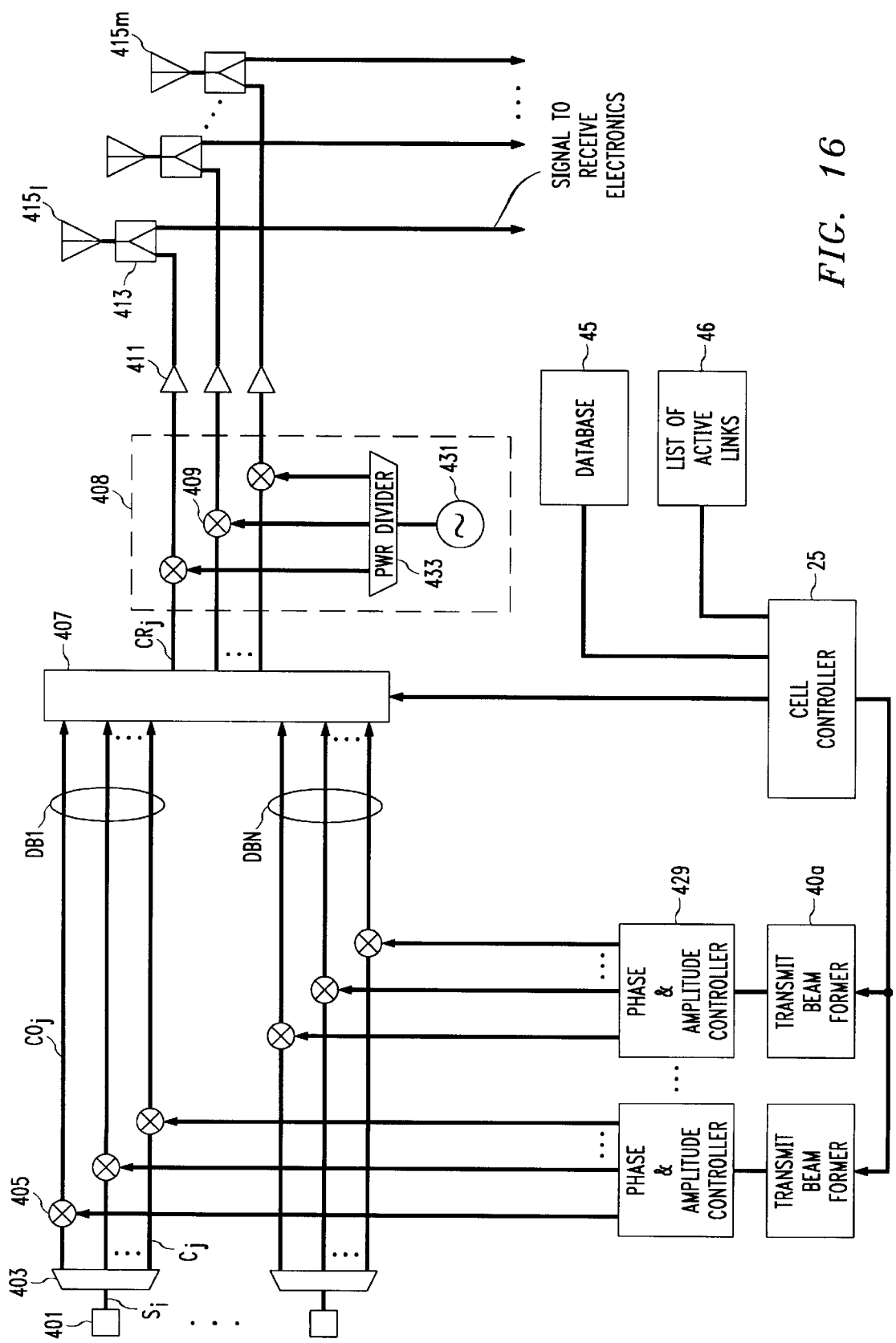
FIG. 16 illustrates exemplary downlink electronics for a multi-beam FWL system according to the present invention.

A portion of the data that the cell controller 25 uses to make slot assignment decisions, and provides to the beam formers 40, shown in FIG. 16 for beam forming calculations, is stored in a data base 45, shown in TABLES 1a and 1b and FIG. 16. In particular, each cell controller 25 within a cluster accesses a data base 45 containing data pertaining to the mutual interference levels between every potential link within its cell and every potential link within its cluster. Since the cluster of each cell of a FWL system according to the present invention is distinct, the data base 45 accessed by a particular cell controller 25 is unique. The data base 45 can be implemented as a computer storage means located at each base station 10, or as a regional computer storage means serving some of the cell controllers, i.e., those within a region, of the FWL system.

TABLE 1a and 1b, below, illustrate an exemplary conceptual organization for the data base 45. TABLE 1a presents an overview of the data base matrix.

As previously mentioned, each cell controller 25 has its own data base. The phrase "in-cell" refers to the cell controller's perspective. In other words, in-cell links refer to links within the cell controller's cell. "In-cluster" links refer to links within the cell controller's cluster, which include links within the cell controller's cell.

entries for each pair of links. Four of the entries pertain to the mutual interference levels between a potential in-cell link, such as the link 47, and potential in-cluster links. Link 49, for example, is one of many potential in-cluster links. The four interference values for each pair of links are described with reference to FIG. 6.

First, link 47 in cell 5f may experience interference due to the link 49 in cell 5h. More specifically, transmission from terminal $15h_3$ on uplink 49 may cause interference at base station 10f on uplink 47, identified by reference numeral 51 in FIG. 6. Moreover, transmission from base station 10h on downlink 49 may cause interference at terminal $15f_{20}$ on TABLE 1a

| IN CELL LINKS | IN CLUSTER LINKS | | | | | | | | | | | |
|---|---|---|---|---|---|---|---|---|---|---|---|---|
| | CELL A | | | | CELL B | | | | FINAL CELL | | | |
| | (A, 1) | (A, 2) | ... | (A, $n_A$) | (B, 1) | (B, 2) | ... | (B, $n_B$) | ... | (FC, 1) | (FC, 2) | ... | (FC, $n_{FC}$) |
| (1) | — | — | ... | — | — | — | ... | — | ... | — | — | ... | — |
| (2) | — | — | ... | — | — | — | ... | — | ... | — | — | ... | — |
| (3) | — | — | ... | — | — | — | ... | — | ... | — | — | ... | — |
| (4) | — | — | ... | — | — | — | ... | — | ... | — | — | ... | — |
| . | — | — | ... | — | — | — | ... | — | ... | — | — | ... | — |
| . | — | — | ... | — | — | — | ... | — | ... | — | — | ... | — |
| . | — | — | ... | — | — | — | ... | — | ... | — | — | ... | — |
| (n) | — | — | ... | — | — | — | ... | — | ... | — | — | ... | - |

As shown in TABLE 1a, the first column in the data base 45 lists all potential "in-cell" links. Paired with each potential in-cell link listed in the first column is every potential in-cluster link. Thus, in-cell link 1 is paired with every other link in the cluster, including $n_A$ links (terminals) in cell A, $n_B$ links in cell B, through $n_{FC}$ links of the final cell of the cluster. Likewise, each other in-cell link, 2 through n, is paired with every in-cluster link.

Figure 6:
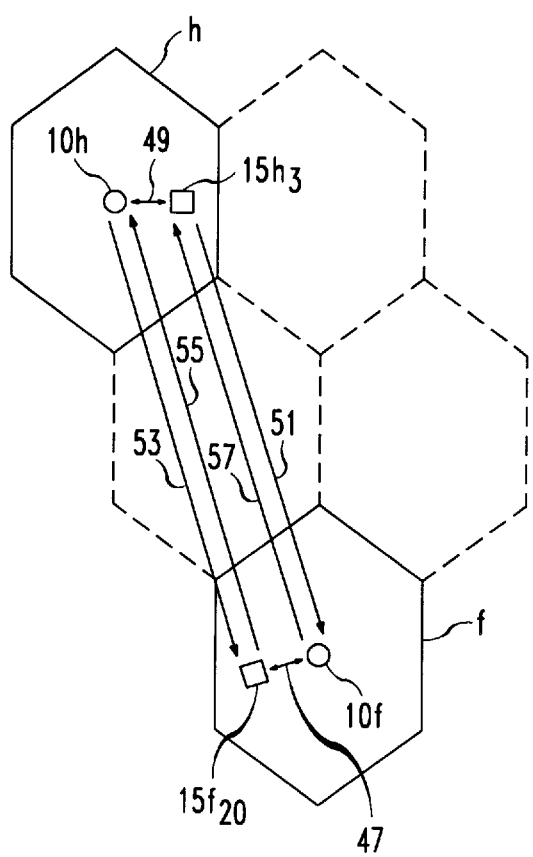
FIG. 6 illustrates two links in different cells and the potential for interference between such links.

TABLE 1b shows exemplary entries for the illustrative pair of links depicted in FIG. 6. FIG. 6 shows a cell 5f and a cell 5h belonging to cell 5f's cluster. Cell 5f contains a link 47 between a base station 10f and a terminal $15f_{20}$, and cell 5h contains a link 49 between a base station 10h and a terminal $15h_3$. Each link represents duplex operation, i.e, uplink and downlink.

For the purposes of illustration, it is assumed that the data base 45 shown in TABLE 1b is the cell 5f data base. As such, link 47 is an in-cell link. The data base 45 contains six downlink 47, identified by reference numeral 53. Secondly, link 49 in cell 5h may experience interference due to link 47 in cell 5f. In particular, transmission from terminal $15f_{20}$ on uplink 47 may cause interference at base station 10h on uplink 49, identified by reference numeral 55. Additionally, transmission from base station 10f on downlink 47 may cause interference at terminal $15h_3$ on downlink 49, identified by reference numeral 57.

TABLE 1b illustrates the data base entries for link 47 in cell f and in-cluster link 49. The first two entries under "Link (h, 3)," 47U and 47D, represent values indicative of the interference experienced in cell f on uplink 47 and downlink 47, respectively. The next two entries, 49U and 49D, represent values indicative of the interference experienced in cell h on uplink 49 and downlink 49, respectively.

TABLE 1b

Exemplary Data Base of Cell f
IN-CLUSTER LINKS

| | CELL h | | | | | |
|---|---|---|---|---|---|---|
| | Link (h, 3) | | | | | |
| In Cell | Interference w/ Cell f | | Interference by Cell f | | Azi. of Term. (h, 3) | Azi. Of In-Cell |
| Links | uplink | downlink | uplink | downlink | from B.S. of Cell f | Terminal |
| . | | | | | | |
| . | | | | | | |
| . | | | | | | |
| 46 | — | — | — | — | — | — |
| 47 | 47U | 47D | 49U | 49D | AZH49 | ZF47 |
| 48 | — | — | — | — | — | — |
| . | | | | | | |
| . | | | | | | |
| . | | | | | | |

In the preferred embodiments, the values in the data base are expressed as normalized signal to interferer power ratios, which are defined herein as J/S. It should be understood that in other embodiments, the data base values can be expressed in other ways, for example, the received interfering signal strength and the like.

As previously noted, a fifth and six entry is included for each link pair. The fifth entry is the "location" of the in-cluster terminal as seen from the in-cell base station, e.g., azimuth of the terminal $15h_3$ with respect to the main lobe of the beam of base station $10f$, represented by AZH49. The location of an in-cluster terminal will be used by the beam formers 40 if instructed by the cell controller 25 to "notch out" that particular terminal. In such an instance, the cell controller 25 retrieves such information from the data base 45 and provides it to the appropriate beam former 40. Note that while in the data base 45, the location of the in-cluster terminal is preferably expressed as an "azimuth," for beam forming calculations, the location of the in-cluster terminal should be expressed as an "angular offset" to the main lobe of the beam. As such, the cell controller determines the difference between the azimuth of the in-cell terminal (direction of the main lobe of the beam) and the "azimuth" of the in-cluster terminal to express the in-cluster terminal's position as an angular offset. The six entry is the azimuth of the in-cell terminal as seen from its own base station, e.g., the azimuth of $15f_{20}$ as viewed from $10f$, represented by AZF47.

Each entry in the data base 45 reflects a measured interferer to signal power ratio. Such ratios are initially determined when a terminal is first placed in service and, in preferred embodiments, periodically updated. Preferably, interference is measured as described below and as illustrated by the exemplary methods of FIGS. 7a and 7b.

Figure 7A:
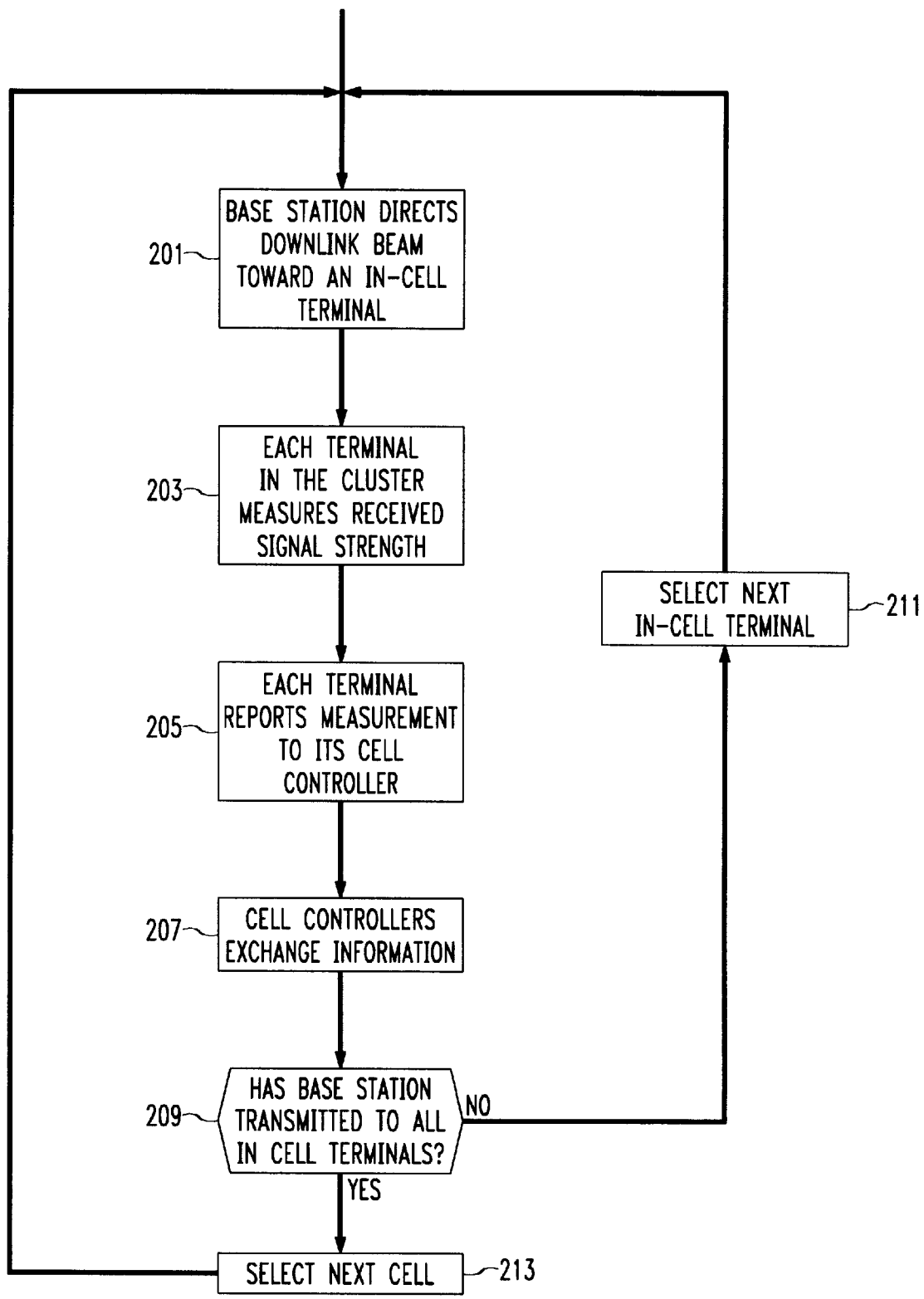
FIG. 7a shows an exemplary method for measuring downlink interference.

FIG. 7a illustrates an exemplary method for measuring down-link interference. As indicated in operation block 201, the base station 10 of a cell 5 ("the primary cell") directs a down-link beam toward a terminal $15_i$ in its cell. The beam generated by the base station 10 for this measurement is the "standard pattern" beam without the interference attenuating notches. Further, the transmit power of the beam is adjusted so that the power received by the terminal $15_i$ conforms to the power control scheme for normal operation. Each terminal 15 within the cell's cluster measures the received signal strength, per operation block 203. Each of the receiving terminals reports its measurement to its respective cell controller 25, as indicated in operation block 205.

Knowing the predetermined received signal power for each terminal, the cell controller calculates the interferer to signal power ratio, if the data base values are to be expressed on this basis.

Each cell controller 25 reports the results of the interference measurements to every cell controller in its cluster. This inter-cell communication is indicated in operation block 207.

Decision block 209 queries whether the transmitting base station has transmitted to each terminal 15 in its cell. If not, the next terminal is selected, as indicated in operation block 211, and the base station of the primary cell transmits to that terminal. The received signal power measurements are repeated by all terminals in the cluster. In this manner, the base station 10 in the primary cell transmits to each terminal 15 in its cell 5, and each terminal 15 in the primary cell's cluster measures the received signal strength during such transmission. This completes the downlink measurements involving the base station 10 of the primary cell.

Once all downlink measurements for the cell are completed, the measurements for another cell can begin, as indicated in operation block 213.

Figure 7B:
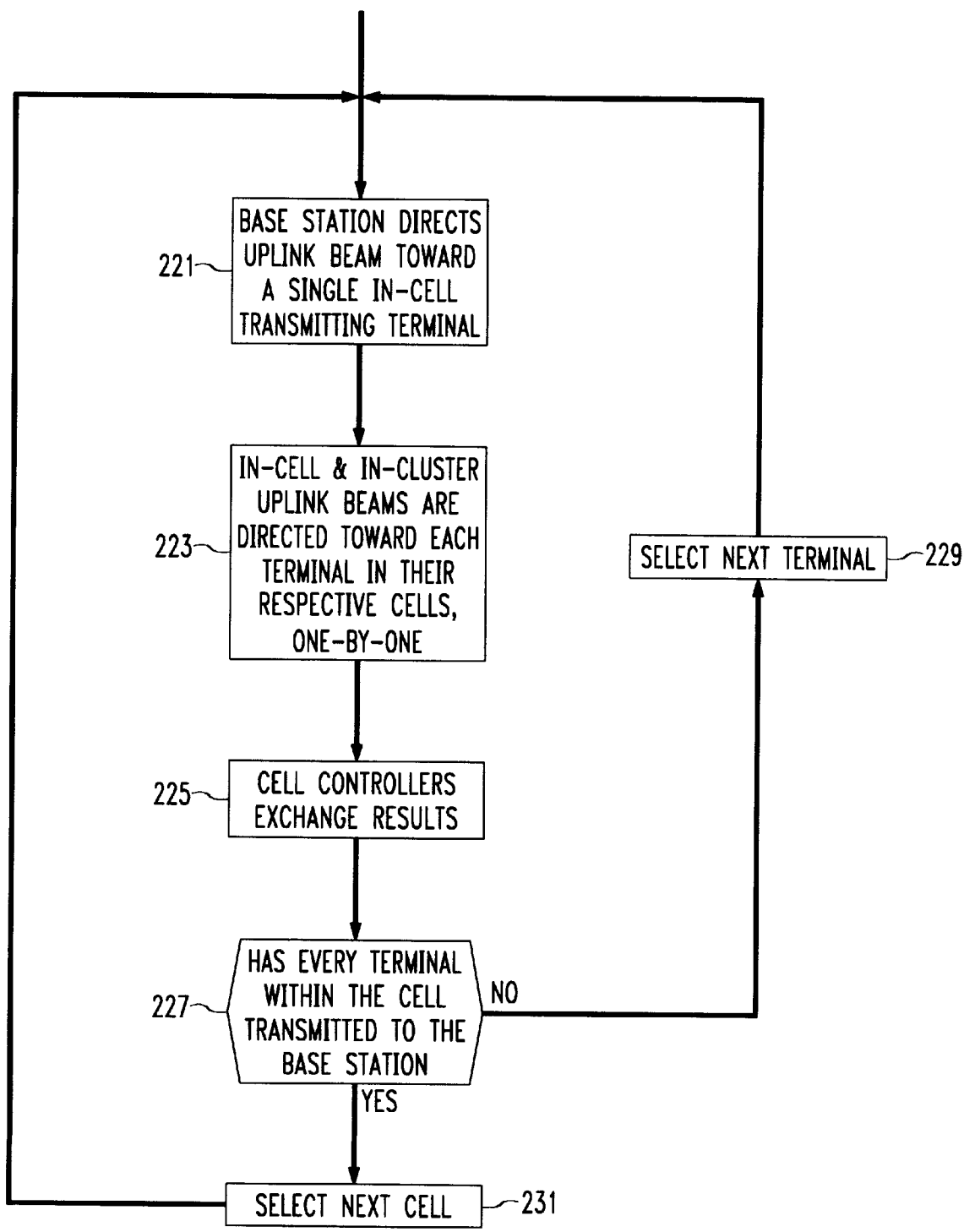
FIG. 7b shows an exemplary method for measuring uplink interference.

A preferred embodiment of a method for measuring uplink interference is shown in FIG. 7b. As indicated in operation block 221, a terminal $15_i$ in a cell 5, again the "primary cell," transmits to its base station, which directs a standard pattern uplink beam 20 toward that terminal. The transmit power of the terminal is adjusted so that the received power at the base station conforms with the power control scheme for normal operation. According to operation block 223, all other uplink beams 20 of the primary cell's cluster are directed to each of the terminals 15 within the respective cells of such beams, terminal by terminal, during the aforementioned transmission. In this manner, the signal power received by an uplink beam when facing every terminal in its cell, due to the one transmitting terminal in the primary cell, is measured and recorded. Again, the standard radiation pattern of the base station antenna is used for measurements, and, if desired, the cell controller will express the measurement results as the normalized signal to interferer power ratio, i.e., interferer power to signal power.

The cell controllers in the cluster, including the primary cell, share the measured information with the each cell controller within their cluster, per operation block 225. Decision block 227 queries whether every terminal within the primary cell has transmitted to its base station. If not, another terminal 15 within the primary cell is selected to transmit, as indicated in operation block 229, and the aforementioned signal power measurements are repeated. Such measurements continue until each terminal 15 within the primary cell has transmitted to the base station 10. Another cell then becomes the primary cell, as indicated in operation block 231, and the interference measurements continue.

Azimuths of in-cell terminals stored in the data base 45 are preferably based on the actual angle of arrival of the strongest multipath replica of the desired signal traveling between a base station 10 and the terminal $15_i$, not a map derived azimuth. When installing a terminal antenna, it is preferable to search for the best location and tune the antenna for the best reception. This may be accomplished by scanning with the base station antenna to locate the direction of arrival of the strongest multipath component of the signal. Based on such measurements, and in conformity with the power control scheme, the transmit power for each transmitter is selected. Note that since uplink and downlink preferably use different transmission frequencies, the measurement must be carried out for both frequencies and some kind of compromise chosen.

For practical reasons, the azimuth of an out-of-cell terminal is based on map-derived azimuths. While it may be desirable to store measured azimuths in preference to map-derived azimuths, obtaining such data would significantly complicate data acquisition. It is believed that such an approach is not presently practical due to the enormity of such a task. For smaller scale systems, however, it might be practical to measure the actual angle of arrival of the dominant interferer signal for any pair of a base station and in-cluster terminal.

In preferred embodiments, a TDM-based FWL system according to the present invention includes appropriate electronics and software for automatic database updating using time slots 35 allocated for such purpose for the duration of the measurements.

In addition to the data base 45, each cell controller 25 maintains its own list of in-cell and in-cluster active links 46.

The list 46 contains all active links in the given cell's cluster, the time slots allocated for the uplink and downlink, and an estimate of the interference-to-signal ratio (TI/S) or the inverse thereof experienced by the uplink receiver (located at the base station) and the downlink receiver (located at the terminal).

Figure 8:
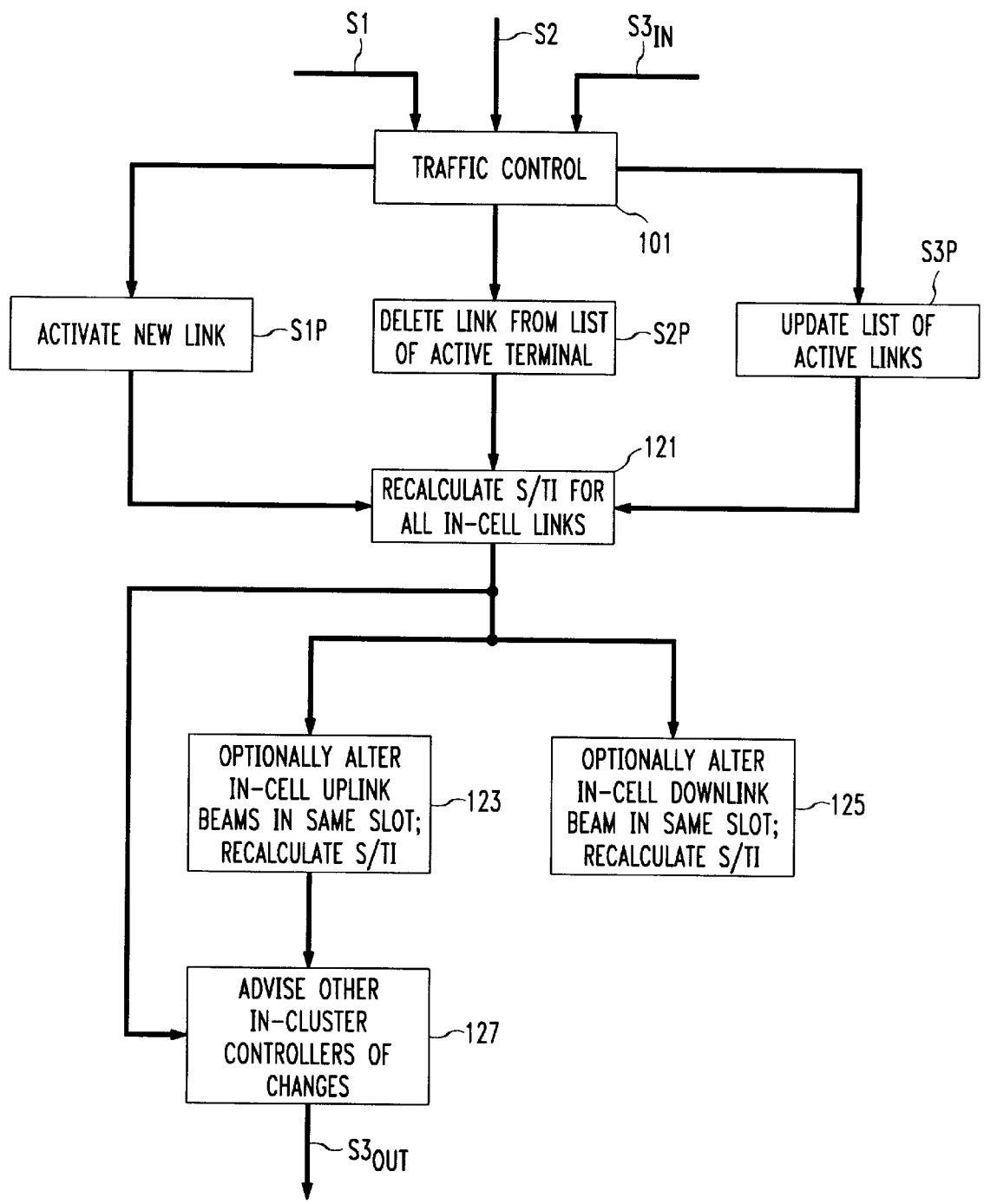
FIG. 8 is an illustration of cell controller activity when advised of changes in in-cluster links.

The cell controller 25 calculates the S/TI for links within its cell using the data base entries, the current list of active links in its cluster and the actual radiation patterns generated to support each link within its cell. As to out-of-cell active links, the cell controller 25 relies on the other cell controllers in its cluster to provide it with the identity, allocated time slots and S/TIs of those links. Such inter-cell communication is required since the cell controller of a given cell cannot calculate the S/TI for a link in another cell since each cell has a distinct cluster. The aforementioned out-of-cell (but in-cluster) information is provided to the cell controller 25 by input data $S3_{in}$, as shown in FIG. 8.

The cell controller 25 of a particular cell takes certain actions with respect to its list 46 when advised of changes in active links anywhere in its cluster. For example, the cell controller 25 may be advised, via input data S2, that a terminal within its cell is going off-the-air. In response, the cell controller deletes the uplink and downlink associated with the terminal from the list 46 as indicated by operation block S2P, recalculates the S/TI for all links in its cell as per operation block 121, and informs, via output data $S3_{out}$, other cell controllers in its cluster of the deletion and the revised S/TI values, as indicated in operation block 127. The cell controller may similarly receive data input $S3_{in}$, which may contain information pertaining to the addition or deletion of out-of-cell links. In response, the controller updates the entries in its list 46, as indicated in operation block S3P in FIG. 8. It then recalculates the S/TI of its cell links as per operation block 121, and advises the rest of the controllers in its cluster about the updated values per operation block 127.

When a cell controller deletes or activates a new link within its own cell, as indicated, respectively, by operation blocks S2P and S1P, or when apprised of a change in status of an out-of-cell link within its cluster via data input $S3_{in}$, a cell controller may optionally alter any of its same-slotted uplink beams, as indicated in operation block 123. Such alteration is for the purpose of minimizing interference caused by the new link. The cell controller then recalculates the S/TI for all same-slotted links within its cell. A controller may likewise decide to alter its same-slotted downlink beams, as indicated in operation block 125. Such alteration is for the purpose of protecting the new link. The cell controller will advise, via $S3_{out}$, the cell controllers in its cluster of the updated S/TI of the uplink beams, as indicated in operation block 127. In presently preferred embodiments, it will not, however, advise other cell controllers of adjustments in the S/TI of downlink beams. Such silence is for the purpose of limiting inter-controller data flow. It should be understood that in other less preferred embodiments, other cell controllers may be advised of adjustments in the S/TI of downlink beams.

While more readily apparent for the case in which a link is added, it is advantageous for a cell controller to alter its beams even for the case of an out-of-cell terminal going off-the-air. In altering its beams by deleting unnecessary notches, the cell controller facilitates generating new notches as required, thereby improving system capacity.

When a cell controller calculates the S/TI (or its inverse) for links within its cell, it uses the normalized signal to interference measurements from the data base. Since, as previously described, the data base measurements are obtained using standard radiation patterns, i.e., the beams used do not include interference mitigating notches, the calculated S/TI should be conservative.

As described above in conjunction with FIG. 4, when a service request is received, the cell controller 25 allocates a receive slot on an uplink beam 20 and a transmit slot on an downlink beam 21 if it finds suitable slots. The cell controller 25 utilizes information from its data base 45 and list of active links 46 in order to do so. Having described the data base 45 and list of active links 46, an exemplary method by which the cell controller allocates uplink and downlink slots can now be described.

Figure 9:
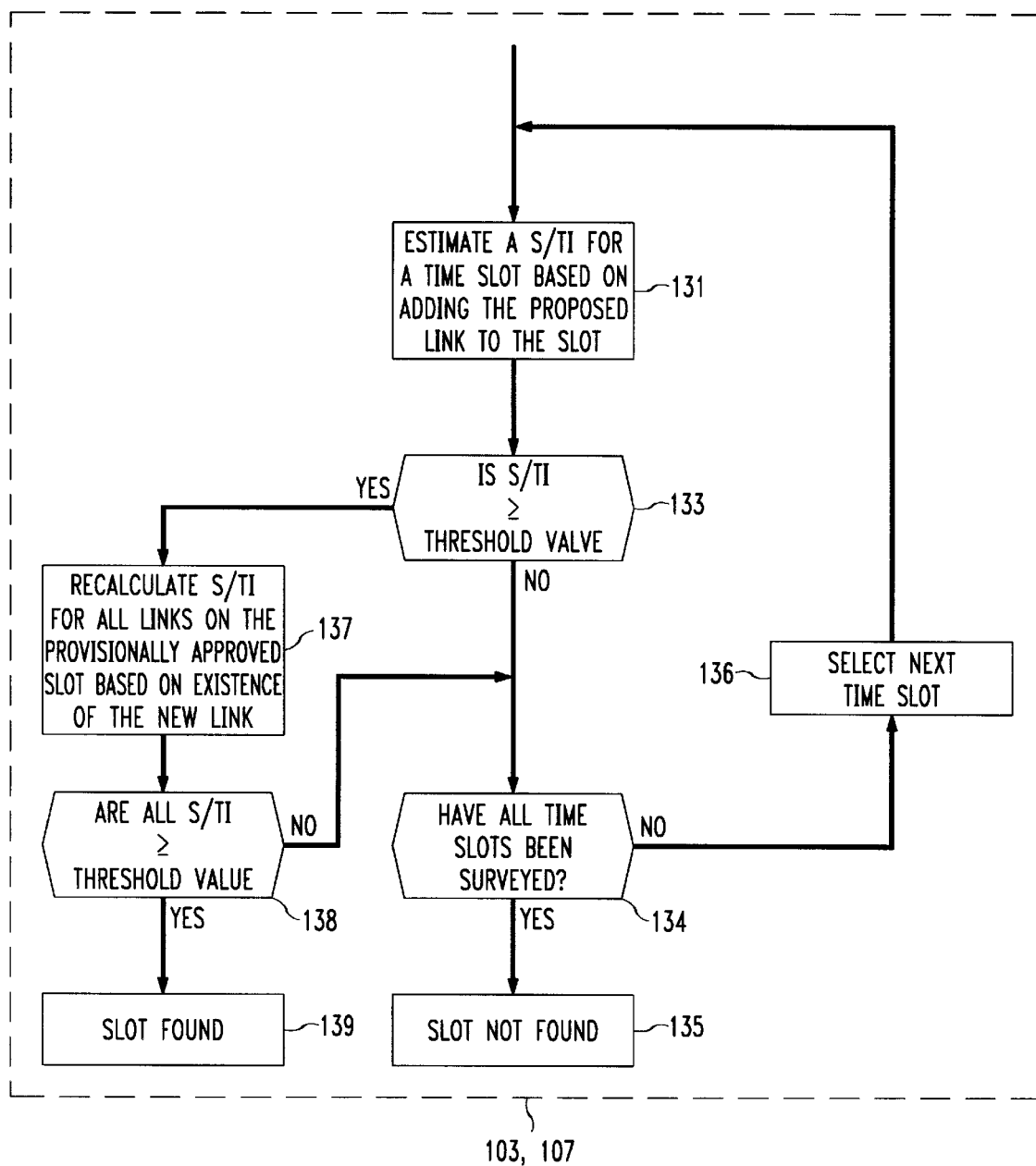
FIG. 9 illustrates an exemplary method for searching for an uplink and downlink time slot.

With reference to uplink slots, the cell controller estimates the S/TI at the base station receiver for the proposed link on a first time slot $35_j$, as shown in operation block 131 of FIG. 9. In determining an uplink slot's suitability, the cell controller 25 takes into account the ability of the uplink beam former 40 within its cell 5 to generate a beam 20 with a plurality of suitably deep notches to attenuate interference from a small group containing the strongest interferers.

The actual achievable interferer attenuation in terms of the ratio between the peak of the main lobe, such as the peak P1 shown in FIG. 5, and the level of the radiation pattern in the direction of the interferer, such as indicated at angular offsets AZ1–AZ6, depends on many factors including, for example, the physical configuration of the antenna, the number of interferers the beam former 40 is trying to attenuate, the angular location of the interferers with respect to the main lobe, the relative power of each interferer, and the antenna tolerances, i.e., the extent by which the actual structure and electronic circuitry differ from the information known to the corresponding beam former. In particular, phase and amplitude drifts can significantly affect the depth and precise location of the notches produced. Nevertheless, given the structural and electrical composition of the antenna and the calibration procedures, it is possible to establish a simple worst case lower bound on the "notch depth" that will almost always be exceeded for a small number of interferers located out a sector considered to be the "main lobe". For example, a lower bound signal to interference ratio of 35 dB might be assumed for interferers located out of the main lobe, while inside the main lobe, the standard pattern is assumed.

Thus, in one embodiment, the cell controller 25 uses the aforementioned bound to calculate the expected S/TI at the base station receiver. The expected S/TI at the base station receiver based on the data base can be expressed as $S/[\Sigma J_i]$, where S is the signal power and $J_i$ is the power received from the ith interferer when standard pattern beams are used. Notches can be implemented in certain directions in order to attenuate a selected group of strong interferers by using a factor $\beta_i$. $\beta_i J_i$ is the interference power remaining after the introduction of the notch. Given the bound, $\beta_i$ is easily determined for each notched out interferer. The factor $\beta$ therefore takes into account the additional reduction in interferer power as defined by the bound. For those interferers that are not notched out, $\beta=1$. The resulting TI/S is thus $[\Sigma \beta_i J_i]/S$.

In an alternative embodiment, rather than using an assumed notch depth, the cell controller 25 calculates the radiation pattern using an exemplary method described later in this specification. The exemplary method determines an optimum "weighting vector" required to generate the beam and also calculates the S/TI. Preferably, the cell controller 25 should allow some margin to account for electrical and mechanical errors that limit the achieveable "depth" of the calculated notches.

In decision block 133, the cell controller queries whether the revised S/TI for the base station receiver is greater than or equal to a threshold S/TI, i.e., the minimum S/TI for "acceptable" reception. If the new S/TI is less than the threshold value, the cell controller checks to see if all uplink slots have been checked, per decision block 134. If all slots have been checked, and none have been found acceptable per block 135, the request is rejected. If not, then the calculation is repeated for another slot, as indicated in operation block 136.

If the calculated S/TI is equal to or greater to the threshold value, then the cell controller determines, in operation block 137, if adding the link affects other base stations that are already on-the-air on that slot to such an extent that the reception of at least one other link becomes unacceptable. This is accomplished by recalculating the S/TI for all active uplinks in the cluster. To perform this calculation, the cell controller 25 retrieves the S/TI of each of such active links from its list 46 and determines the effect of the additional interference, based on the corresponding data base entry. The new value of S/TI resulting from the addition of the considered new link is:

$$\frac{1}{[\sum J_i]/S + J_n/S} = \text{expected } S/TI \text{ after the new link is added}$$

If the calculated S/TI of any of the on-the-air links degrade beyond the point of acceptability, the time slot is rejected.

In considering the effect of the added terminal 15 on other terminals, the cell controller 25 does not rely on the ability of other base stations 10 to generate radiation pattern notches intended to minimize the interfering effect of the terminal $15_i$. The reason for this is that other cell controllers cannot respond to such a request in "real time." Thus, the cell controller 25 will approve a receive slot only if all of the out-of-cell active uplinks using that slot can sustain the additional expected interference before adjusting their current beam. After notification of a new link, the cell controllers of affected cells will, however, preferably reduce their received interference by altering their uplink beams 20 as previously noted in conjunction with the discussion of FIG. 8.

Decision block 138 queries if the S/TI for all existing links is equal to or greater than a threshold value. If so, an uplink slot is found, per block 139. If the S/TI for one or more links is less than the threshold, then the time slot under consideration is rejected. If all time slots have been considered, then the request for service is denied. If additional time slots remain to be checked, the next slot is selected per operation block 136 and the S/TI for the time slot is calculated and processed as previously described.

The cell controller 25 performs essentially the same steps when considering a downlink slot. In operation block 131, the S/TI of the terminal receiver is calculated for a candidate time slot. The interference at the terminal receiver will be caused by other base stations. The cell controller will not rely on the ability of the controllers of such other base stations to alter their downlink beams by adding a notch for the benefit of the requesting terminal. As such, the calculated S/TI is based on the data base.

If the calculated S/TI at the receiver for the candidate slot is greater than or equal to a threshold value, the cell controller further verifies that all of the terminals 15 in its cluster currently receiving on that slot can sustain the additional interference of the base station's transmission. For this calculation, the cell controller 25 calculates the affected S/TI values using values from the data base 45. If necessary, the cell controller can rely on the ability of its beam formers to generate a number of notches, the depth of which can be conservatively estimated using a bound.

All calculations and comparisons are repeated until a suitable pair of slots are found or until all time slots have been checked and no suitable pair of slots are found. If the cell controller 25 finds a pair of slots satisfying the requirements, it will direct the beam formers 40 to generate the receive and transmit beams during the selected slots. Otherwise the requesting terminal will be denied access.

Beam forming has been referenced briefly a number of times above. A more detailed description of beam forming is now provided. It will be appreciated that the beam formers 40 must complete their calculations rapidly to avoid system delays. A dedicated powerful microprocessor may be required for each beam former.

The cell controller 25 provides each beam former 40 with specific information required for beam forming. More particularly, to calculate the radiation pattern for a downlink beam 21 for transmission to a terminal $15_i$, a beam former 40 is provided with:

(i) the azimuth of the terminal $15_i$;

(ii) a short list, which can be empty, of phase offsets (measured with reference to the main lobe) to avoid; and (iii) a quantity representing the relative importance of transmission suppression on each phase offset.

To calculate the radiation pattern for an uplink beam 20 for receiving a transmission from terminal $15_i$, a beam former 40 is provided with:

(i) the azimuth of the terminal $15_i$;

(ii) a short list, which can be empty, of phase offsets to "null out;" and (iii) the anticipated power of every interferer in the short list, which is obtained from the data base 45.

Both radiation pattern calculations can be calculated according to the exemplary methods described later in this specification. The calculations are very similar, a difference being that, for the downlink, the "quantity representing the relative importance of transmission suppression on each phase offset" must first be expressed as a "virtual interferer power" through a simple monotonically increasing conversion function. For example, consider link A and link B, both of which appear in the short list provided to the downlink beamformer 40. Reception on link A is marginal, while reception on link B is better, i.e., a higher S/TI ratio. The virtual interferer power corresponding to link A should result in a relatively deeper notch being formed in the direction of link A than the notch formed in the direction of link B. It should be understood that such a function is dependent upon the specific configuration of the base station antenna, among other considerations, and is selected by the antenna designer. Selection of such a function is within the capabilities of those skilled in the art.

The result of the calculations is the weighting vector, W. The calculated vector is then stored and reused during the same time slot 35 in following frames 30. Note that a notch resulting from the beam forming calculations provides a S/TI at the receiver that is greater than or equal to the S/TI estimated during slot allocation using the lower bound signal to interference value.

Beam forming operations are described in more detail in conjunction with FIGS. 11–14. To facilitate the description, the preferred configuration of the base station antenna will be provided. The terminal antenna is described, as well.

It is desirable for the antenna located at each terminal $15_{1-N}$ to be small, inexpensive and easy to install. Notwithstanding the desire for simplicity, in some embodiments, the terminal antenna is mechanically adjustable in such a way that a radiation dip can be realized in one or two directions. The reason for this is that a large portion of the interference power typically comes from a single source. Interference may thus be attenuated, albeit crudely, by an installation-time adjustment based on the geographic location of the base station that is expected to be the main source or object of interference.

In one embodiment, the terminal antenna is fabricated from two parts such that the spacing between the parts can be mechanically adjusted. Such an antenna will have a variable width main lobe bordering a notch that can be mechanically adjusted over a limited angular range. Other physical configurations for achieving the aforementioned objective will occur to those skilled in the art.

The base station's antenna is considerably more complex than the terminal antenna. The base station's antenna is a phased array antenna capable of simultaneously generating N transmit beams and N receive beams. The transmit and receive beams are independently steerable in any direction in the horizontal plane under the control of a beam former 40. When steered in azimuth, a beam maintains an approximately fixed beam width in the vertical plane. Preferably, the beam width ranges from 15 to 20 degrees at the 3 dB points. In areas that are flat, narrower vertical beams can advantageously be used.

Figure 10:
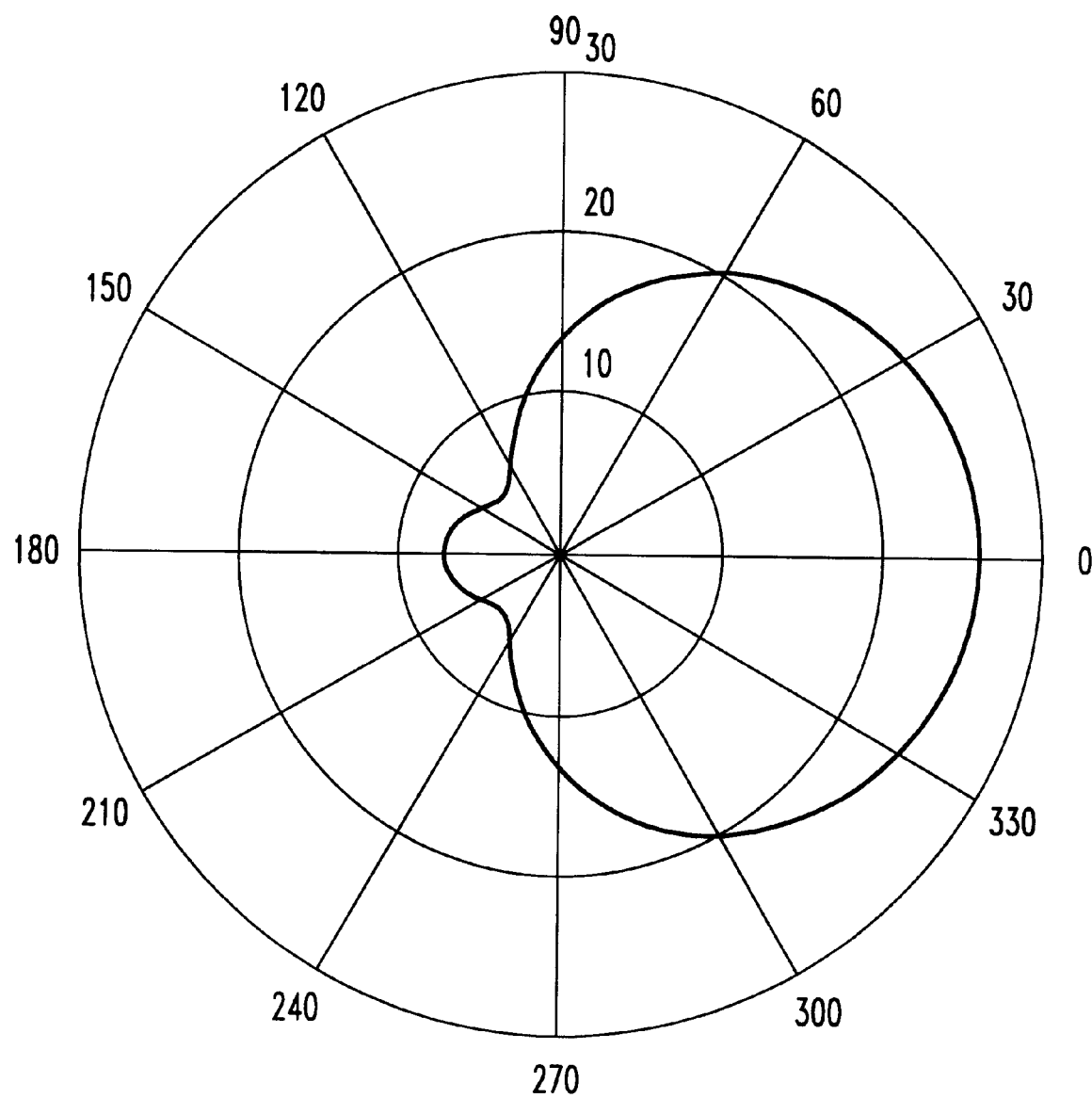
FIG. 10 shows an exemplary radiation pattern of a radiator.

The antenna of the base station 10 is preferably configured as a planar circular array having vertically-placed radiating elements attached to the surface of a virtual vertical cylinder of radius R. The centers of such radiators are aligned thereby defining a ring in the horizontal plane. Each radiating element can be, for example, a vertical colinear array of some basic radiator. An exemplary radiation pattern of a radiating element in the horizontal plane is shown in FIG. 10. The pattern shown in FIG. 10 is the measured pattern of a vertical array of four patch antennas. Antenna size is dictated, as a practical matter, by frequency, real estate and cost considerations. Configurations other than a planar circular array can suitably be used.

In order to take full advantage of the directivity of individual radiators and minimize the effects that might otherwise result from hardware and harnesses that may be installed inside the cylindrical volume, only part of the total number of radiators are active to generate the beam. The active radiators occupy a sector facing the direction of the desired beam, and are distributed approximately equally on either side of a line crossing the center of the circular structure pointing toward the desired direction of the main lobe. The sector including the active radiators is referred to herein as "the active sector" of the beam. The angular width, $\alpha$, of the active sector is a free design parameter that should be optimized for the selected radiation pattern of the individual radiator and the number of radiators in the cylindrical array.

Figure 11:
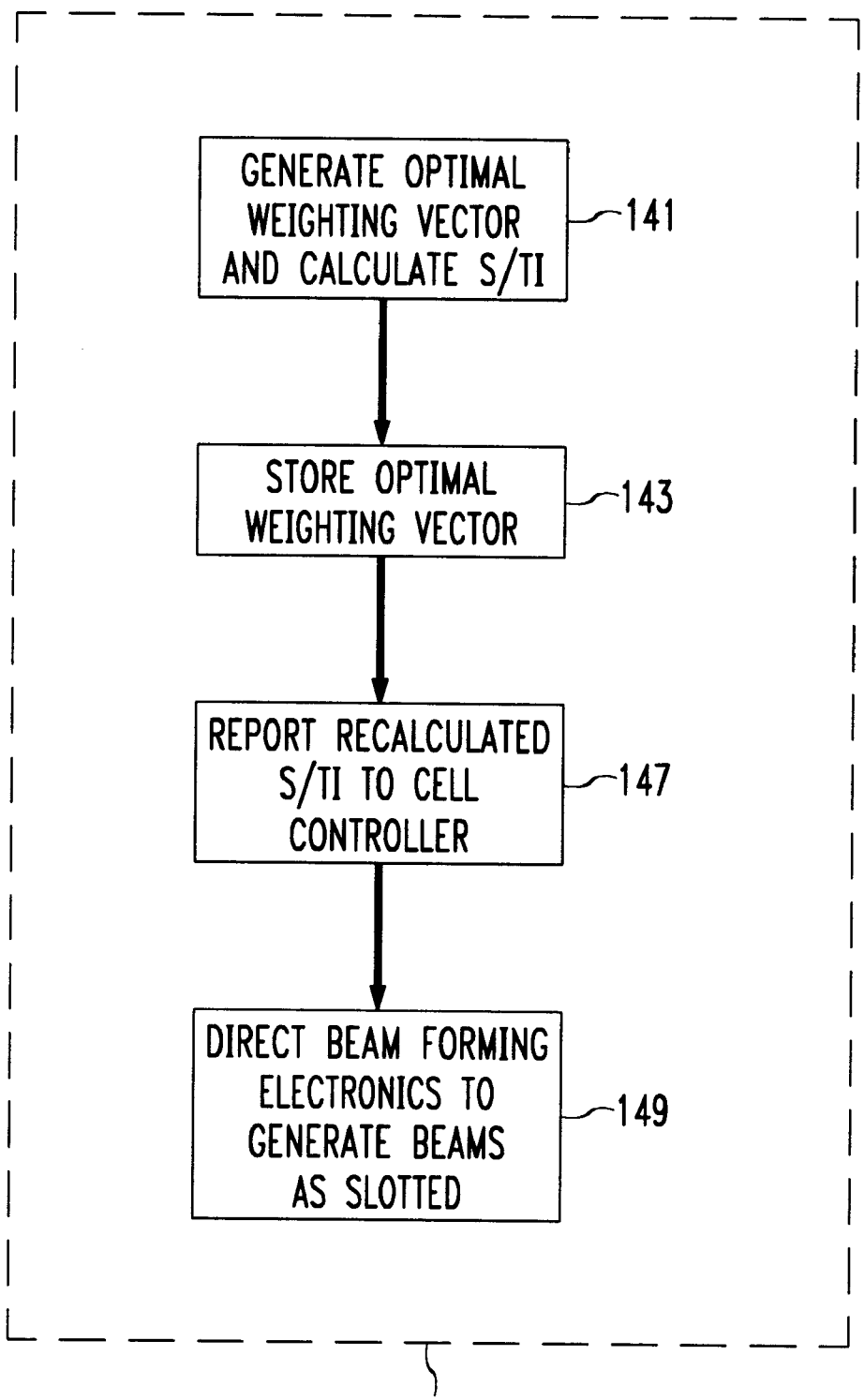
FIG. 11 shows a flow diagram of beam former operation.
Figure 12:
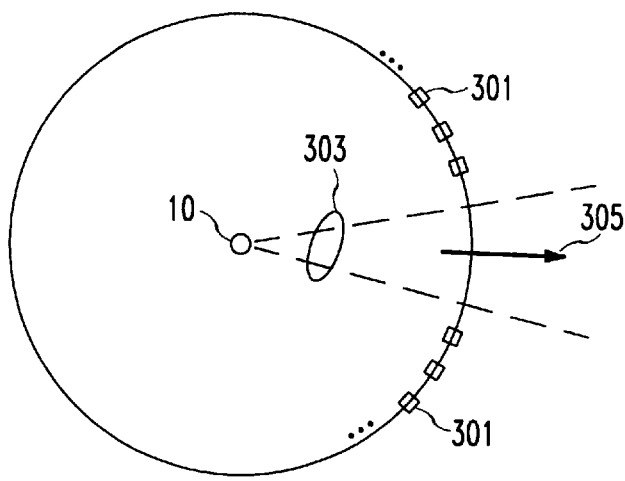
FIG. 12 is a conceptual illustration of a beam-forming environment including only background interferers.

An exemplary method for generating the "standard pattern" of an uplink beam is described below. As indicated in operation block 141 of FIG. 11, a weighting vector, W, is generated that optimizes the S/TI at the antenna output. A detailed description of the calculation method is provided later in this specification. For the calculations, it is assumed that a base station 10 antenna is located at the center of a large circle placed in a horizontal plane, as shown in FIG. 12. A large number, I, of equal power noise sources 301 are assumed to be equally spaced along the circumference of the circle, and such sources cover the complete circumference except for a clear window region 303 that is free of noise sources and has one signal source 305, which is the desired signal, located at the center of the region 303. The width of the clear window 303 is a design parameter to be optimized. Such optimization can be performed, for example, by using the exemplary calculation method for determining the optimal weighting vector described below for several values of window width and choosing the one yields the best S/TI.

Figure 13:
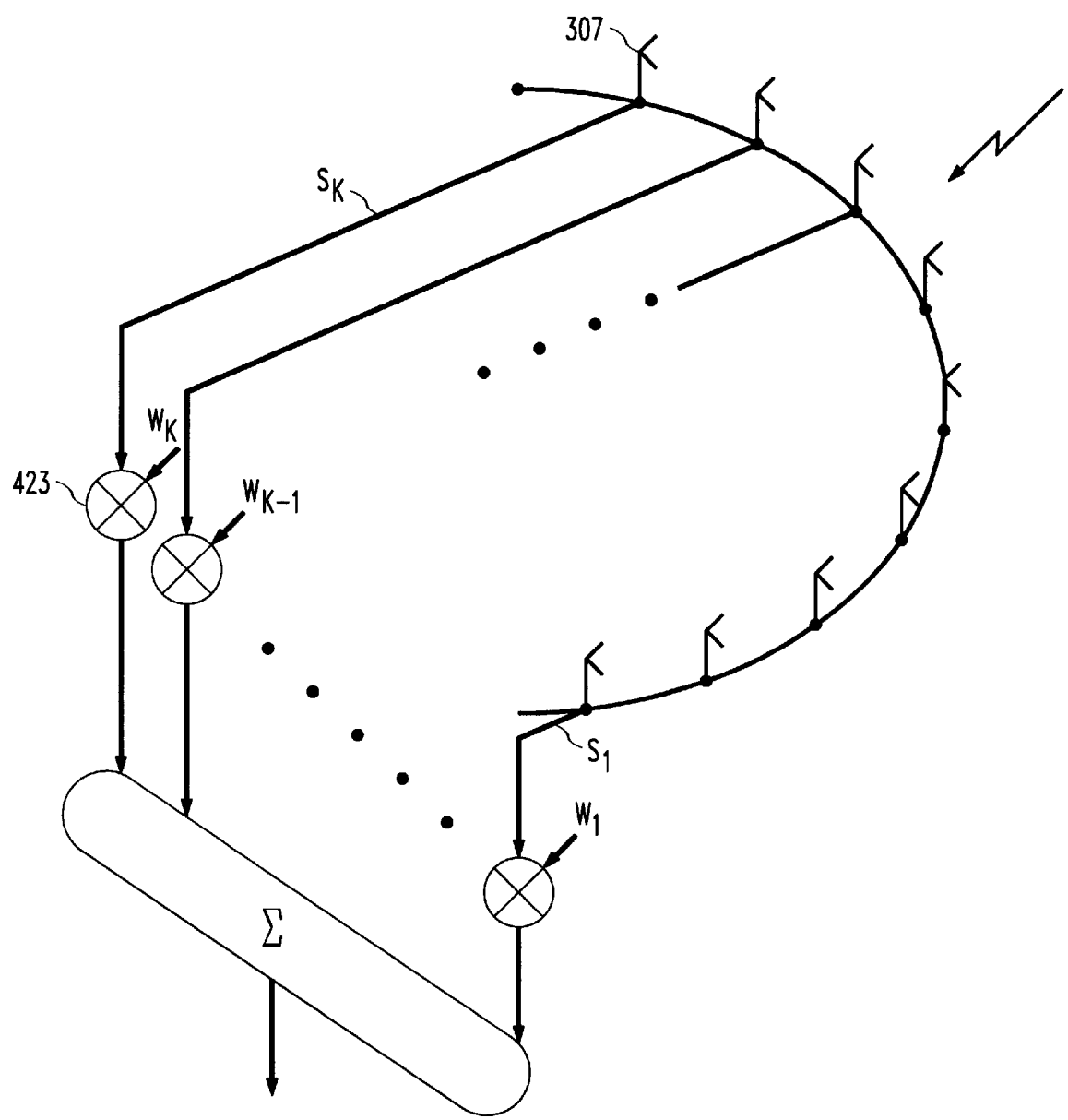
FIG. 13 schematically illustrates the multiplication of radiator signals by the corresponding components of the optimal weighting vector to yield a radiation pattern having an optimized signal-to-total-interference ratio at the antenna output.
Figure 15:
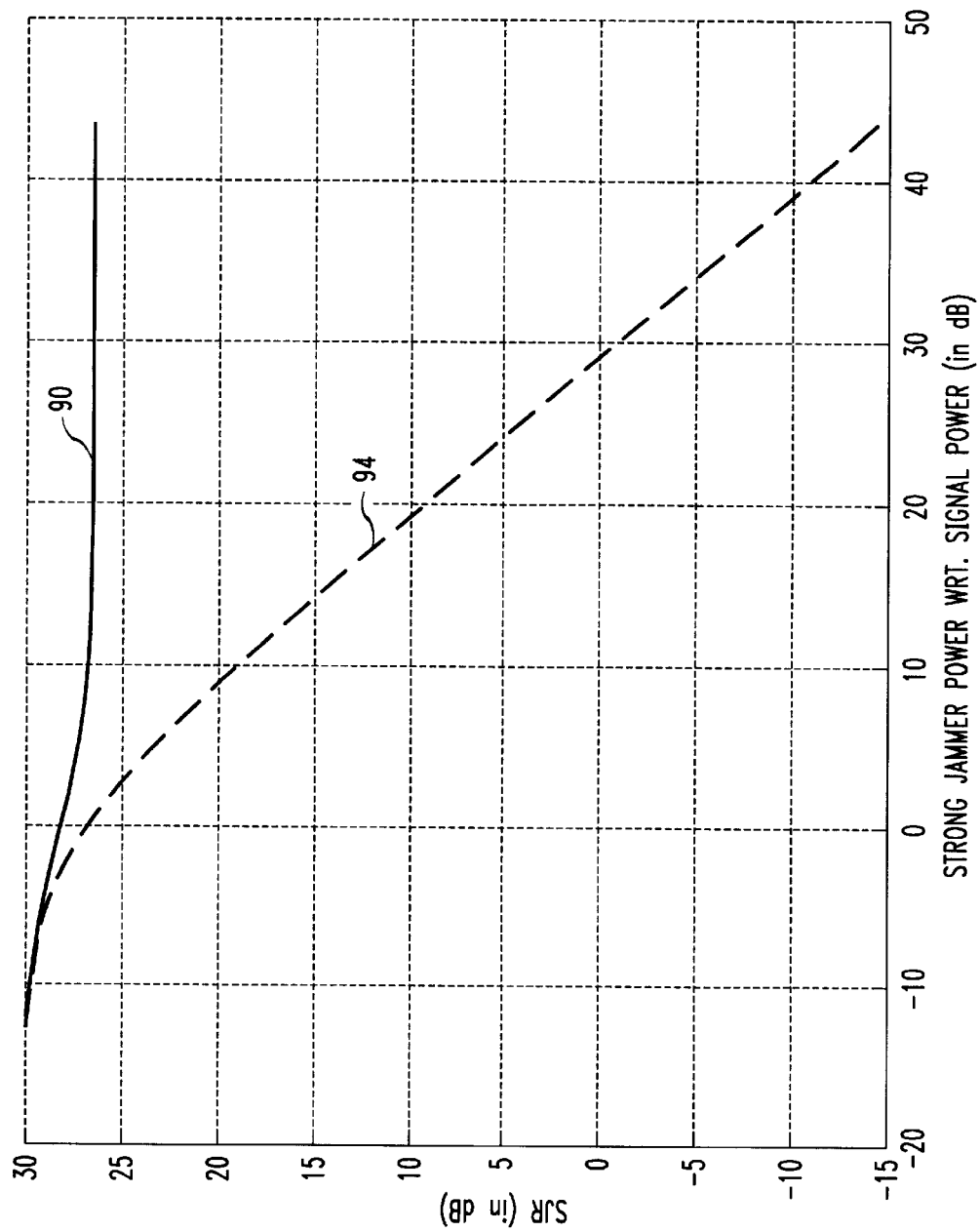
FIG. 15 shows the effect that notching out strong jammers has on signal-to-interference ratio.

As indicated in operation block 143 of FIG. 11, the optimal weighting vector is stored and later used in the same time slots 35 in following frames 30. According to operation block 147, the S/TI is calculated and provided to the cell controller 25, and, ultimately, to other cell controllers in the cluster. Meanwhile, beam forming electronics, described in conjunction with FIGS. 15-17, generate the beam, per operation block 149. FIG. 13 provides a conceptual illustration of how the weighting vector W is used to generate a beam.

As shown in FIG. 13, signals $S_1$–$S_k$ received by K radiating antenna elements 307 are multiplied, using multipliers 423, by the corresponding component of the vector W and then summed to produce a radiation pattern that optimizes the S/TI at the antenna output.

Figure 14:
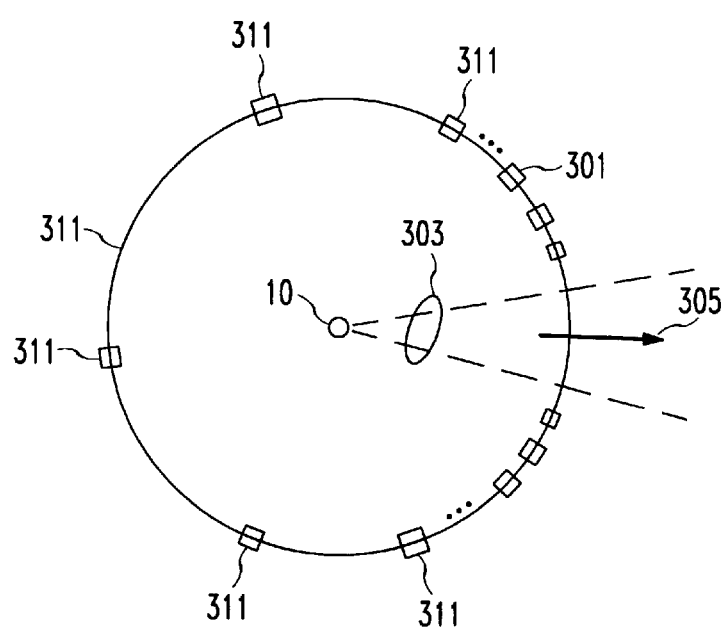
FIG. 14 is a conceptual illustration of a beam-forming environment including several strong jammers.

Generating the optimum S/TI as described above results in the "standard" radiation pattern previously mentioned in conjunction with measurements for the data base 45. Beams having a standard radiation pattern address the large number of background interferers 301 without taking into account the location and power of any interferer in particular. In a further preferred embodiment, if the location and relative power of a group of especially strong interferers are known, they can be considered in addition to the large number of equal power interference sources 301 in deriving the optimal weighting vector W. Such specific interferers are illustrated in FIG. 14.

Essentially the same method is followed to generate the weighting vector W for the downlink beams 21. As previously described, the method differs in that a virtual signal source is placed in the desired transmission direction and virtual interferers are placed in the directions in which interference generation is to be avoided. The power of the virtual interferers reflects the importance assigned to minimizing transmission in those directions.

In response to locating virtual interferers in certain directions, a beam former 40 generates a beam having notches in those directions. The depth of each notch reflects the power of the virtual interferer. It should be understood that while in theory notch depth (expressed in dB with reference to the beam's main lobe) is unlimited, in practice, notch depth is limited. In particular, notch depth is limited by the propagation irregularities such as multipath propagation, reflections from conducting objects, and the like. Also, as previously mentioned, notch depth is limited by antenna tolerances.

After determining the optimal W, the S/TI is calculated. An exemplary method for determining the weighting vector W in a way that optimizes the S/TI at the antenna output now follows.

The radiation pattern of each radiator in the horizontal plane is $g(\Phi)$, where the array consists of K radiators arranged along a circular section. The amplitude of the signal received by radiator k from a source located in the horizontal plane at angle $\Phi$ is proportional to the quantity $S_k(\Phi)$, where the phase reference is the center of the circle of radius R:

$$S_k(\Phi)=g(\Phi-\Phi_k)\text{Exp}\{j2\pi(R/\lambda)\text{Cos }(\Phi-\Phi_k)\} \qquad \text{A1}$$

The signal voltage received by the complete array will be:

$$V_s = \sum_{k=1}^{K} W_k S_k(0) \qquad \text{A2}$$

where $W_k$ is the complex weight of the kth radiator.
This inner product can be written as a multiplication of two column vectors:

$$V_s = W'S(\Phi) \qquad \text{A3}$$

where W' indicates W transposed.

A small number of dominant interferers are assumed to exist, whose angular location and field intensity in the area where the antenna is located are precisely known. In addition to those dominant interferers, a large number of "background" interferers exsists. The background interferers are not individually accounted for. Rather, they are replaced, for beam synthesis purposes, with uniformly spaced equal power interference sources. All interferers are assumed uncorrelated.

The total number of interferers is represented by I. Then the noise voltage received by the kth radiator is:

$$v_n(k) = W_k \sum_{i=1}^{I} n_i S_k(\Phi_i) \qquad \text{A4}$$

And the total interference voltage is:

$$V_n = \sum_{k=1}^{K} v_n(k) = \sum_{K=1}^{K} W_k \sum_{i=1}^{I} n_i S_k(\Phi_i) \qquad \text{A5}$$

The expected interference power is:

$$P_N = E\{|V_n|^2\} \qquad \text{A6}$$

$$= E\left[\sum_{k=1}^{K} W_k \sum_{i=1}^{I} n_i S_k(\Phi_i) \cdot \sum_{l=1}^{K} \overline{W}_l \sum_{j=1}^{I} \overline{n}_j \overline{S}_l(\Phi_j)\right]$$

Where the "bar", e.g., $\overline{W}_l$, indicates the complex conjugate.
When the interference sources are uncorrelated:

$$E\{n_j \overline{n}_i\} = n_j^2 \delta_{ji} \qquad \text{A7}$$

the interference power reduces to:

$$P_n = \sum_{k=1}^{K} \sum_{l=1}^{K} W_k \overline{W}_l \sum_{i=1}^{I} n_i^2 S_k(\Phi_i) \overline{S}_l(\Phi_i) \qquad \text{A8}$$

This may be written in a compact matrix form:

$$P_n = W^* M W \qquad \text{A9}$$

($W^*$ is W conjugate and transpose) where the elements of M are given by:

$$m_{kl} = \sum_{i=1}^{I} n_j^2 \overline{S}_k(\Phi_i) S_l(\Phi_i) \qquad \text{A10}$$

The signal power to interference power ratio may then be expressed as:

$$S/TI = \frac{|W'S(\Phi)|^2}{W^*MW} \qquad \text{A11}$$

S/TI reaches maximum when the weighting vector is chosen as:

$$W_{opt} = M^{-1}\overline{S}(\Phi) \qquad \text{A12}$$

Finding the optimal weight vector requires calculating the terms of a K by K matrix and then inverting it. If, however, only a single interferer is being added or dropped, the matrix can be modified using a "fast" algorithm, described later in this specification.

Once $W_{opt}$ has been found, the radiation pattern is calculated from:

$$F(\Phi) = S'(\Phi)W_{opt} \qquad \text{A13}$$

The S/TI obtained when using $W_{opt}$ can be calculated:
Since:

$$MW_{opt} = \overline{S}(\Phi) \qquad \text{A14}$$

$$S/TI = \frac{|W'_{opt}S(\Phi)|^2}{W^*_{opt}\overline{S}(\Phi)} = \frac{(W'_{opt}S(\Phi))(W^*_{opt}\overline{S}(\Phi))}{W^*_{opt}S(\Phi)} = W'_{opt}S(\Phi)$$

$$= F(\Phi)$$

$F(\Phi)$ is a power ratio, and therefore should be converted to dB with: $10\text{Log}(F(\Phi))$.

In this application, $-\delta \leq \Phi \leq \delta$ where $2\delta$ is the angular separation between two radiators. When there is a need to steer a beam out of this limited range, a new active range is selected, i.e., some (possibly all) radiators are replaced by others.

The field generated by the array in direction $(\Phi,\theta)$ is given by:

$$E_s(\Phi, \theta) = \sum_{k=1}^{K} W_k S_k(\Phi, \theta) \qquad \text{A15}$$

where:

$$S_k(\Phi,\theta)=g(\Phi-\Phi_k,\theta)\exp\{j2\pi(R/\lambda)\text{Cos }(\alpha_k)\} \qquad \text{A16}$$

and:

$$\text{Cos}(\alpha_k)=\text{Sin}(\theta)\text{Cos}(\Phi-\Phi_k) \qquad \text{A17}$$

Substituting A16 & A17 into A15:

$$E_s(\Phi, \theta) = \sum_{k=1}^{K} W_k g(\Phi - \Phi_k, \theta)\exp\{j2\pi(R/\lambda)\cos(\Phi - \Phi_k)\sin(\theta)\} \quad \text{A18}$$

The directivity of the antenna in direction ($\Phi$,$\theta$) can be calculated by determining:

$$D = \frac{\text{reception from direction } (\Phi, \theta)}{\text{average reception intensity}}$$

$$= \frac{|E_s(\Phi, \theta)|^2}{1/4\pi \int_0^{2\pi} d\Phi \int_0^{\pi} |E_s(\Phi, \theta)|^2 \sin\theta\, d\theta}$$

See, Sureau et al., "Sidelobe Control in Cylindrical Arrays," IEEE Trans. Ant. Prop., Vol. AP-30, no. 5, 1982; Applebaum, "Adaptive Arrays," IEEE Trans. Ant. Prop., Vol. AP-24, no. 5, 1976.

EXAMPLE

Assume that the antenna array contains 3K=96 elements spaced 0.55 $\lambda$ apart around a horizontal circle. A beam is generated by activating only one third of such elements. The 32 activated elements are located on a 120 degrees "horseshoe" facing the the location of the desired signal. The signal source is at $\Phi$=0.

The kth antenna element is therefore located at:

$$2\pi(k-K/2-0.5)/(3K) \text{ radians} \quad \text{A19}$$

The radius, R, of the cylinder supporting the antenna elements is R=8.4033 $\lambda$. The amount of calculations can be limited by dividing the interferers to two groups. The first group represents a small number of dominant interferers whose precise location and intensity are known. Such dominant interferers are accounted for on an individual basis. The second group of interferers is considered to be a large number of equal power interferers placed uniformly around the antenna keeping a "clear window" of w radians. All interferers are considered uncorrelated. All the interferers generate the same noise power, $n_j$, which is arbitrarily chosen as 1. The angle between any two interferers is: $(2\pi-w)/I$ radians.

The ith interferer is located at:

$$w/2+(2\pi-w)(i-0.5)/I \quad \text{A20}$$

The "clear window" is generated by setting the power of the two interferers on either side of $\Phi$=0 to 0. w is therefore equal to 2(2$\pi$/100).

Substituting equations A15 and A16 into equation 1:

$$S_k(\Phi_i) = g(w/2+(i-0.5)(2\pi-w)/I-2\pi(k-K/2-0.5)/(3K))\cdot\exp\{j2\pi(R/\lambda)\cos(w/2+(i-0.5)(2\pi-w)/I-2\pi(k-16.5)/(3K))\}\text{A21}$$

For the chosen parameters, the radiation pattern obtained with I>100 is essentially independent of I. Therefore I is chosen to be 100.

The function g($\Phi$) must be defined. For the present example, an analytic approximation to the measured radiation pattern of a "Patch Antenna" is used:

$$g(\Phi)=\cos^4(\Phi/2)+0.17\cos^4((\pi-\Phi)/2)-0.0568 \quad \text{A22}$$

Substituting equation A22 into A21, and A21 into A10, the covariance matrix M is obtained. $W_{opt}$ and the electric field F($\Phi$) are then calculated from equation A13.

To find the optimal weighting vector for the case where a group of N strong interferers, each with interfering power $n_j^2$; j=1, . . . ,N are known to exist at given angular locations, the corresponding terms are added to the elements of the matrix M (equation A10). The calculation proceeds according to the previously described method. The resulting radiation pattern is shown in FIG. 5

As long as the power of the strong interferers is not higher than the combined power of the interferers representing the background noise, the modified radiation pattern remains very close to the original (i.e., with no strong interferers) except at the "immediate vicinity" of a interferer, where a sharp notch appears.

FIG. 5 shows the radiation pattern generated by the exemplary algorithm when 98 "weak" interferers (100 minus the 2 that were eliminated in order to generate the clear window) and in addition six "strong", equal power, interferers located as shown are specified. FIG. 14 shows the S/TI ratio when the power of the strong interferers is the independent variable. The signal power was first set in the absence of the strong interferers so that the resulting S/TI ratio obtained is 30 dB. It can be seen that when the antenna beam is adjusted to compensate for the increasing power of the "strong" interferers, as indicated by reference numeral 90, the S/TI ratio degrades very slowly, while when W is held fixed indicating no adjustment, as indicated by reference number 94, the S/TI degrades rapidly.

Returning now to the issue of calculating the vector W. Since, the set of significant interferers for a given link can change relatively often, W must be recalculated frequently. Thus, in preferred embodiments, a "short cut" or "fast" method for recalculating an existing beam whenever a single interferer is added or deleted is utilized. An exemplary embodiment of such a fast method is described below.

As previously described, e.g., equation A12, calculating $W_{opt}$ involves inverting the matrix M, which is a square K×K matrix. If K is large, i.e., there are many radiators, this is a calculation intensive task. Once the matrix M is known, however, modifying it to add or delete a single interferer can be done using a simplified method. The short-cut method uses the following theorem:

If a matrix A can be written as:

$$A=B+\alpha UV'$$

where: U & V are column matrices, then:

$$A^{-1}=B^{-1}-\lambda\alpha YZ'$$

where:

$$Y=B^{-1}U;\ Z'=V'B^{-1};\ \text{and } \lambda=1/(1+\alpha Z'U)$$

Based on the previous derivation the matrix M can be written as:

$$M = M_{nc} + \sum_{j=1}^{N} n_j^2 \text{conj}(S(\Phi_j))S'(\Phi_j)$$

where: $S(\Phi_j)$ is the column vector: $[S_1(\Phi_j)\ S_2(\Phi_j)\ \ldots\ S_K(\Phi_j)]'$;

conj(S) is the complex conjugate of S, and S'($\Phi$) is the transpose of S($\Phi$).

N is the number of additional interferers to be "notched" out, $\Phi_j$ with j=1, . . . , N is their location and $n_j^2$ is their corresponding power. M is the modified matrix and $M_{nc}$ is the matrix used in the original interference environment.

As before:

$$W = M^{-1} \text{conj}(S(\Phi))$$

Therefore, addition or deletion of the $j^{th}$ interferer means that the Matrix M should be modified as follows:

$$M^{(k)} = M^{(k-1)} + \beta^k n_j^2 \text{conj}(S(\Phi_j)) S'(\Phi_j)$$

where: $M^{(k)}$ is the matrix used after the $k^{th}$ step (i.e., following the inclusion/deletion of the $j^{th}$ interferer);

$M^{(k-1)}$ is the matrix used in the $(k-1)^{th}$ step (i.e., the original matrix);

$\beta^k = +1$ if adding an interferer; $\beta^k = -1$ if deleting an interferer.

The new M matrix can be inverted as follows:

$$M^{(k)-1} = M^{(k-1)-1} - \lambda \alpha YZ'$$

where:
  $Y = M^{(k-1)-1} U$; $U = \text{conj}(S(\Phi_j))$
  $Z' = V' M^{(K-1)-1}$; $V = S'(\Phi_j)$
  $\lambda = 1/(1+\alpha Z'U)$; $\alpha = \beta^k n_j^2$
and:
  $W^k = M^{(k)-1} \text{conj}(S(0))$
  This method requires around $3K^2+2K$ multiplies.

In a further preferred embodiment, the fast method can be further shortened by the following substitutions:

Since: V=conj(U'); M=conj(M') and Z=conj(Y'),
  the optimal vector can be calculated directly by determining the following quantities:
  1. $\alpha = \beta n^2$
  2. $Y = M^{(k-1)-1} U$
  3. $\lambda = 1/\{1+\alpha \text{conj}(Y')U\}$
  4. $M^{(k)-1} = M^{(k-1)-1} - \lambda \alpha Y \text{conj}(Y')$
  5. $W^{(k)} = W^{(k-1)} - \lambda \alpha Y \text{conj}(Y') \text{conj}(S(0))$ where: $W^{(k)}$ is the new optimal weighing vector to be used in step k and $W^{(k-1)}$ is the optimal vector used in step k−1.

This method requires around $2K^2+4K$ multiplies and $2K^2+3K$ additions. In comparison, the direct method of calculating the M matrix and inverting it to find the optimal W requires around $K^2+K+O(K^3)$ multiplies.

Figure 17:
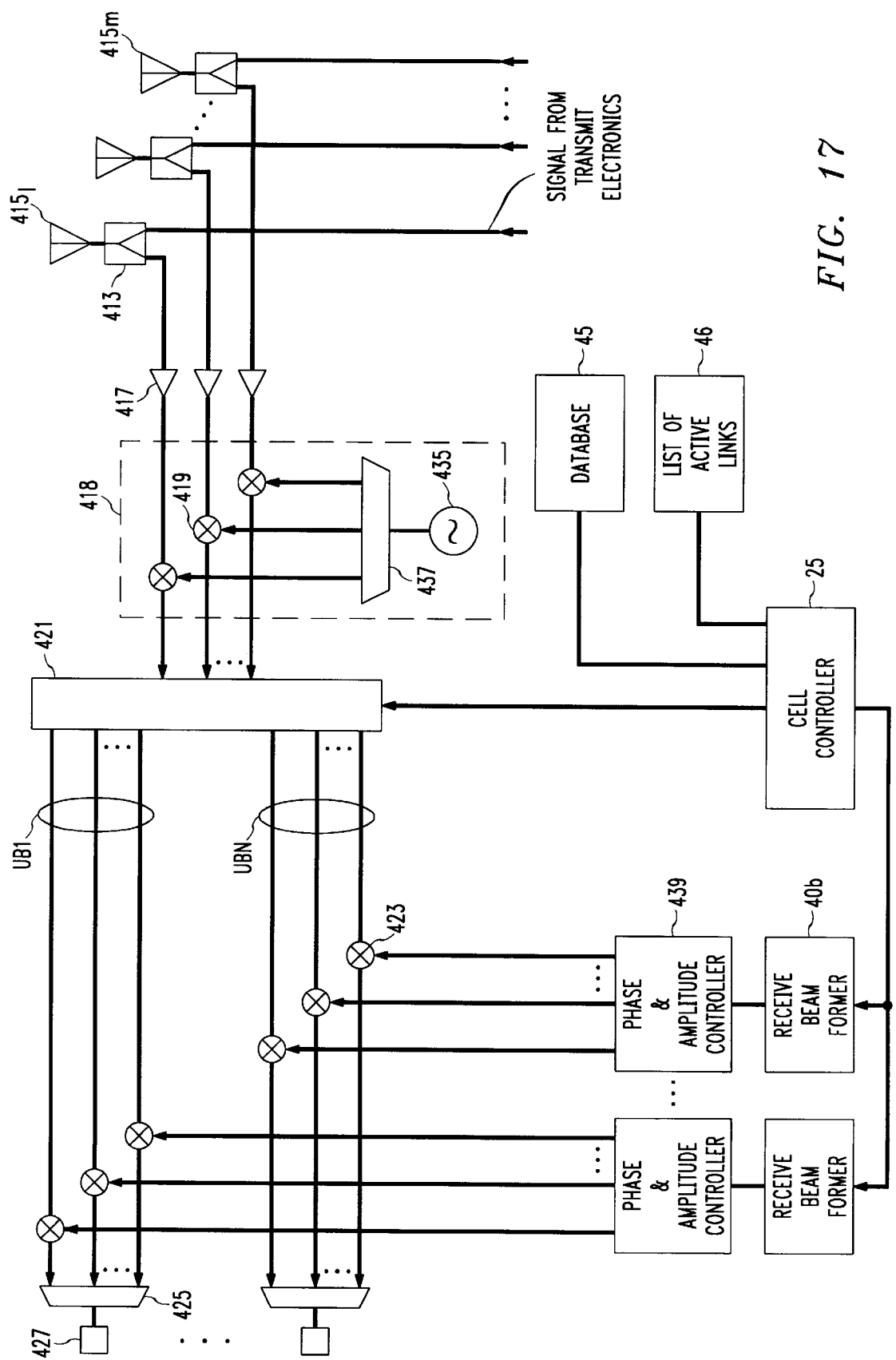
FIG. 17 illustrates exemplary uplink electronics for a multi-beam FWL system according to the present invention.
Figure 18:
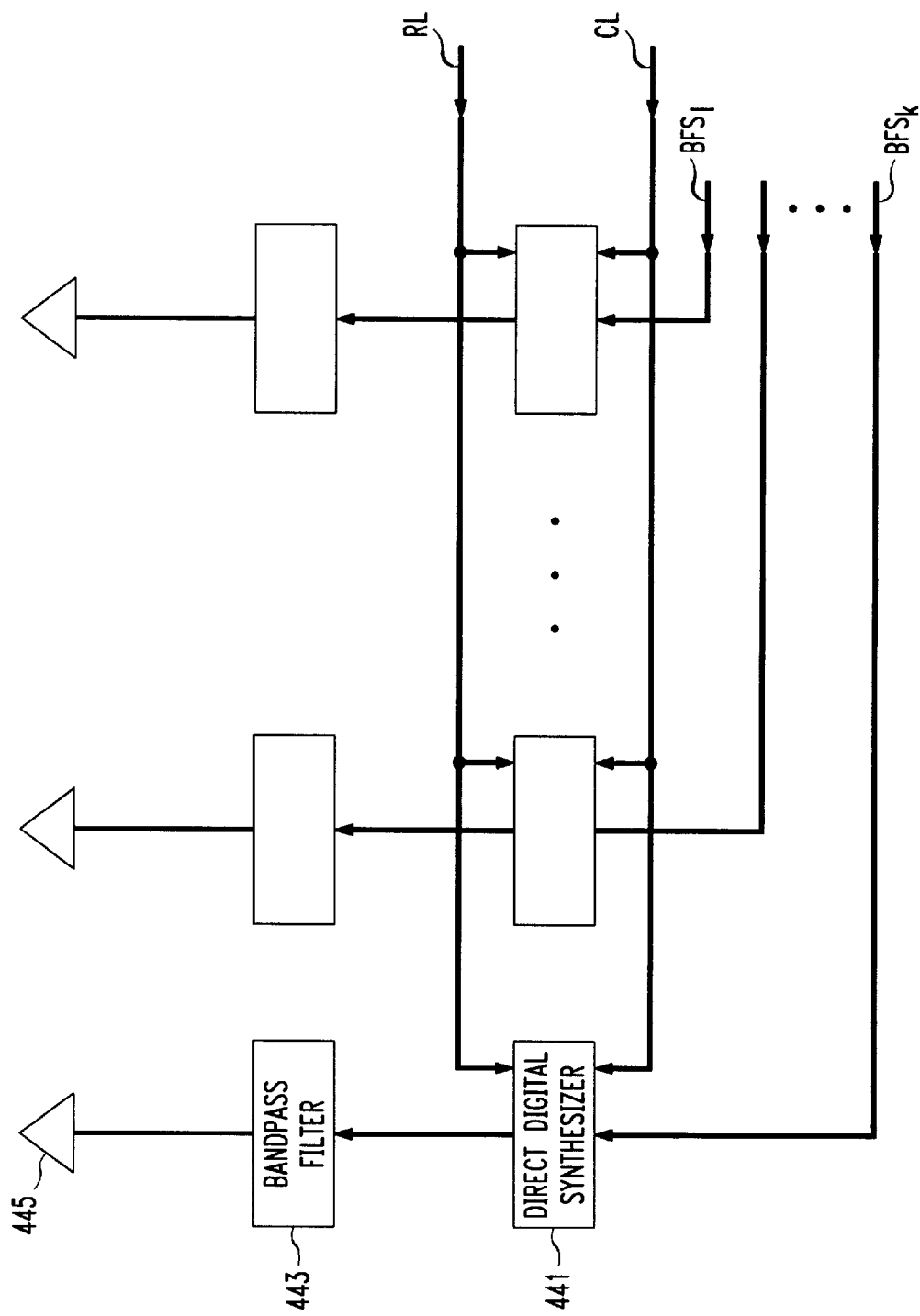
FIG. 18 shows an exemplary architecture of the phase and amplitude controllers.

Block diagrams of some of the important signal receiving, beam generating and signal transmitting electronics of a base station 10 are shown in FIGS. 16–18. It should be understood that such block diagrams omit many components that are not essential for understanding the invention, e.g., filters, IF amplifiers and the like. It will be appreciated that illustrations are provided to facilitate understanding of the invention, not to limit its scope.

FIG. 16 illustrates exemplary base station transmit (downlink) electronics for a multiple beam system according to the present invention. A number, N, of transmit modems 401, preferably operating at IF frequency, each provide a signal, $S_i$, intended for transmission to a terminal 15. The number N is the number of transmit (downlink) beams DB1–DBN. The signals $S_{1-N}$ are provided, one each, to N power dividers 403. The power dividers 403 divide each signal $S_i$ into K channels $C_j$.

The N groups of K channels $C_j$ are sent to N banks of K multipliers 405. The multipliers multiply each channel $C_j$ by the appropriate one of K sine waves generated by N phase and amplitude controllers 429. The amplitude and phase of each sine wave is dictated by the appropriate component of the weighting vector W, which is calculated by one of the downlink beam formers 40a under the control of the cell controller 25.

The resultant K channels $CO_j$ for each beam are sent to a downlink switching and summing matrix 407, which, under the control of the cell controller 25, routes each of the groups of K channels $CO_1$–$CO_k$ into K contiguous possibly overlapping radiator channels $CR_1$–$CR_k$. All the radiator channels are fed to an up-converter 408. The up-converter 408 up-converts the output of the switching and summing matrix 407 to the transmit frequency. The up-converter comprises a bank of mixers 409, a power divider 433 and a local oscillator or synthesizer 431. Note that a common synthesizer 431 is used.

The up-converted radiator channels are fed to a bank of M power amplifiers 411, one per radiator, where M is the total number of radiators comprising the phased array antenna. The amplified channels are sent to a bank of M diplexers 413, one per antenna radiator. The diplexers route the channels to the K active radiators 415.

FIG. 17 illustrates exemplary receive (uplink) electronics for a multiple beam system according to the present invention. The signals received by the radiators 415 pass through the bank of diplexers 413 to a bank of M low noise amplifiers 417 and then to a down converter 418. The down-converter 418 down-converts the frequency of the received signals for processing in the switching and dividing matrix. Like the up-converter 408, the down-converter comprises a bank of mixers 419, a power divider 437 and a local oscillator or synthesizer 435. Again, the synthesizer 435 is common.

The uplink switching and dividing matrix 421, under the control of the cell controller 25, routes the signals from N groups of K contiguous radiators to the appropriate beam electronics. N banks of K multipliers each multiply the K signals for each beam by the appropriate one of K sine waves generated by N phase and amplitude controllers 439. The amplitude and phase of each sine wave is dictated by the appropriate component of the weighting vector W, which is calculated by one of the uplink beam formers 40b under the control of the cell controller 25.

The K signals comprising an uplink beam UB1–UBN are fed to a power combiner 425, which feeds the combined signal to one of N receive modems 427.

FIG. 18 shows an exemplary architecture of the phase and amplitude controllers. Each phase and amplitude controller 429, 439 includes K direct digital synthesizers (DDSs) 441. Each DDS 441 generates a sine wave, the phase and amplitude of which is controlled by an appropriate one of K signals $BFS_{1-K}$ for a given uplink or downlink beam generated by the respective beam formers 40b, 40a. The bank of K DDSs is clocked by a common clock line, CL, and reset by a common reset line, RL. Bandpass filters 443 ensure that the signal sent to the mixers 423 are clean of undesired spurious. Amplifiers 445 amplify the signals produced by the DDSs. 441.

Although a number of specific embodiments of this invention have been shown and described herein, it is to be understood that these embodiments are merely illustrative of the many possible specific arrangements that can be devised in application of the principles of the invention. Numerous and varied other arrangements can be devised in accordance with these principles by those of ordinary skill in the art without departing from the scope and spirit of the invention.

For instance, other known methodologies can be used in conjunction with the present "open loop" method. One example of this is using an "adaptive beamforming" in an attempt to improve the S/TI of a received signal once the signal is already on-the-air. An adaptive beam may be implemented by using a closed-loop adaptation algorithm driven by the designated receiver of each receive beam. Such closed-loop adaptation algorithms are well known to those skilled in the art. Such a method might avoid the need for frequent calibrations of the base station's antenna system in order to counter possible drifts in the electronic circuitry supporting each individual radiator. Another feature of such a embodiment may be the ability of an adaptive beam to track temporal changes of links parameters.

We claim:

1. A method for beam forming, wherein the beam supports a communications link and wherein a specific group of strong interferers cause significant interference with and experience significant interference from the communications link, comprising the steps of:

(A) retrieving data from storage pertaining to mutual interference levels experienced by and caused by the communications link, which data is periodically updated by interference measurements;

(B) calculating a first optimal weighting vector that optimizes the signal to total interference ratio of an antenna beam at an antenna output based on the data retrieved in step (A), the first optimal weighting vector comprised of a number, K, of components, the number K being equal to a number of active radiating antenna elements involved in forming the antenna beam; and (C) multiplying each one of a plurality of signals received from or intended for each one of the K active radiating antenna elements by a corresponding component of the first optimal weighting vector.

2. The method of claim 1 wherein, in step (A), a cell controller retrieves the data from storage and provides it to beam formers.

3. The method of claim 2 wherein, in step (B), the beam formers calculate the first optimal weighting vector.

4. The method of claim 3 wherein step (B) further comprises generating a plurality of sine waves corresponding in number to the plurality of signals, wherein, the amplitude and phase of each sine wave is determined by the corresponding component of the first optimal weighting vector.

5. The method of claim 1 wherein, in step (B), the first optimal weighting vector, $W_{opt}$, is calculated according to the expression:

$$W_{opt} = M^{-1}\overline{S}(\Phi)$$

where: M is the covariance matrix of the interference sources;

S($\Phi$) is a vector, each component of which corresponds to a signal received by or delivered to one of the active radiating antenna elements; and $\Phi$ is the direction of the desired main lobe.

6. The method of claim 5 wherein, after calculating the first optimal weighting vector, one interferer is added to or substracted from the specific group of interferers, and a second optimal weighting vector is calculated based on the first optimal weighting vector according to the expression:

$$W^{(k)} = W^{(k-1)} - \lambda \alpha Y \text{conj}(Y') \text{conj}(S(\Phi_j)),$$

where:

$W^{(k)}$ is the optimal weighting vector after accounting for the one interferer;

$W^{(k-1)}$ is the first optimal weighting vector, $M^{(k)-1} = M^{(k-1)} - \lambda \alpha Y \text{conj}(Y')$, $\lambda = 1/[1 + \alpha \text{conj}(Y')U]$, $Y = M^{(k-1)-1}U$, $\alpha = \beta^k n_j^2$, $U = \text{conj}(S(\Phi_j))$, $S(\Phi_j) = [S_1(\Phi_j) \ S_2(\Phi_j) \ldots S_K(\Phi_j)]'$, S($\Phi_j$) is a vector, each component of which corresponds to a signal received by or delivered to one of the active radiating antenna elements, $\Phi_j$ = azimuth of the interferer, conj(S) is the complex conjugate of S.

$\beta^k = +1$ if one interferer is added and $-1$ if one interferer is substracted, and $n_j^2$ is the power of the interferer.

7. An article comprising:

a processor; and a computer-readable storage medium having computer-readable program code embodied therein for causing the processor to optimize a signal to total interference ratio of an antenna beam generated by a phased-array antenna, the program code comprising:

code segment for causing the processor to calculate a first optimal weighting vector based on information pertaining to a group of interferers;

code segment for causing the processor to multiply the first optimal weighting vector by corresponding signals received from or delivered to radiators of the phased-array antenna.

8. The article of claim 7, wherein the program code further comprises:

code segment for causing the processor to calculate a second optimal weighting vector using information developed during the calculation of the first optimal weighting vector and information pertaining to the addition or deletion of one interferer to the group of interferers.

9. A method for generating an uplink beam at a base station to facilitate a terminal's uplink transmission to the base station in a first communications link, comprising the steps of:

(A) receiving a request to generate the uplink beam in a first time slot allotted to the first communications link based on interference caused by and experienced by the uplink of the first communications link;

(B) obtaining the terminal's azimuth, a list of phase offsets, measured with reference to a main lobe of the uplink beam, corresponding to the received direction of interference from interferers, and further receiving the anticipated power of every interferer represented in the list of phase offsets; and (C) generating a beam with notches for attenuating the interference received from the interferers.

10. The method of claim 9 further comprising generating a downlink beam at the base station to facilitate the base station's transmission to the terminal, comprising the steps of:

(D) receiving a request to generate the downlink beam in a second time slot allotted to the first communications link based on interference caused by and experienced by the downlink of the first communications link;

(E) obtaining the terminal's azimuth, a list of phase offsets to avoid, and further receiving a quantity representative of the relative importance of transmission suppression on each phase offset; and (F) generating a beam with notches for attenuating the signal transmitted toward the phase offsets listed in step (E).

* * * * *